(12) United States Patent
Malhotra et al.

(10) Patent No.: US 11,687,812 B2
(45) Date of Patent: Jun. 27, 2023

(54) AUTOCLASSIFICATION OF PRODUCTS USING ARTIFICIAL INTELLIGENCE

(71) Applicant: ACCENTURE GLOBAL SOLUTIONS LIMITED, Dublin (IE)

(72) Inventors: Reema Malhotra, New Delhi (IN); Mamta Aggarwal Rajnayak, New Delhi (IN); Govindarajan Jothikumar, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 276 days.

(21) Appl. No.: 16/996,477

(22) Filed: Aug. 18, 2020

(65) Prior Publication Data
US 2022/0058504 A1    Feb. 24, 2022

(51) Int. Cl.
*G06N 20/00*    (2019.01)
*G06N 7/01*    (2023.01)

(52) U.S. Cl.
CPC ............... *G06N 7/01* (2023.01); *G06N 20/00* (2019.01)

(58) Field of Classification Search
CPC ........ G06N 20/00; G06N 3/00; G06K 9/6282; G06F 16/2453; G06Q 10/087
See application file for complete search history.

(56) References Cited

U.S. PATENT DOCUMENTS

| 7,349,917 B2 | 3/2008 | Forman et al. |
| 10,528,907 B2 | 1/2020 | Pobbathi et al. |

| 2012/0093397 A1* | 4/2012 | Wang | G06V 10/446 |
| | | | 382/159 |
| 2014/0172652 A1* | 6/2014 | Pobbathi | G06Q 10/087 |
| | | | 705/28 |
| 2016/0063358 A1* | 3/2016 | Mehrseresht | G06F 16/5838 |
| | | | 382/190 |
| 2016/0364419 A1* | 12/2016 | Stanton | G06F 16/2453 |
| 2017/0236070 A1* | 8/2017 | Xu | G06N 20/00 |
| | | | 706/12 |
| 2018/0319015 A1* | 11/2018 | Sinyavskiy | G06N 3/00 |

OTHER PUBLICATIONS

Abhimanyu Sundar, "ML-Powered Product categorization for smart shopping options", Dec. 18, 2018, 25 pages.
(Continued)

*Primary Examiner* — Saba Dagnew
(74) *Attorney, Agent, or Firm* — Mannava & Kang, P.C.

(57) ABSTRACT

A system for auto classification of products includes an entity recognizer and a model selector. The entity recognizer receives training data including an attribute of a product. The model selector selects a feature from the training data using a first statistical model to provide a first feature and a second statistical model to provide a second feature, and trains a probabilistic classifier using the first and the second features for providing a first and a second classification models respectively. Further, the model selector calculates an accuracy score of the obtained classification models for each distinct category in a preset hierarchy of categories and selects a classification model from the obtained classification models based on the accuracy score. The selected classification model has a highest accuracy score for a corresponding category in the preset hierarchy.

20 Claims, 11 Drawing Sheets

(56) References Cited

OTHER PUBLICATIONS

Ali Cevahir et al., "Large-scale Multi-class and Hierarchical Product Categorization for an E-commerce Giant", Proceedings of COLING 2016, the 26th International Conference on Computational Linguistics: Technical Papers, pp. 525-535, Osaka, Japan, Dec. 11-17, 2016.

Dan SHEN et al., "Large-scale item categorization for e-commerce", Research Gate, Conference Paper, Oct. 2012, 11 pages.

Vivek GUPTA et al., "Product Classification in E-commerce using Distributional Semantics", Jul. 25, 2016, 17 pages.

* cited by examiner

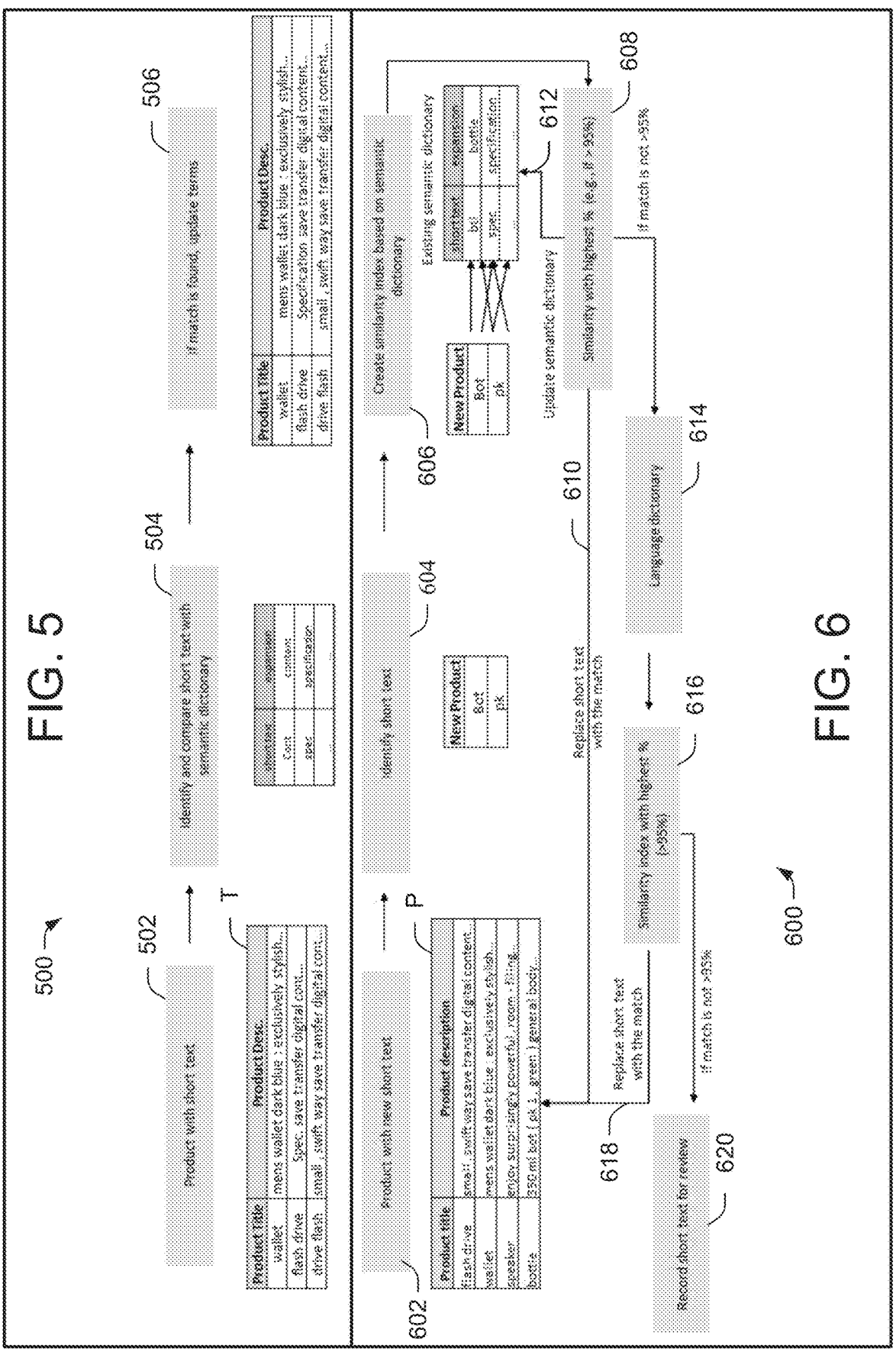

AUTOCLASSIFICATION OF PRODUCTS USING ARTIFICIAL INTELLIGENCE

BACKGROUND

E-commerce provides an effective way of doing business. A customer can conveniently visit a website, browse an online marketplace, or use a search engine to remotely search, browse, or shop for desired products (or services). An online search result to return the desired product is dependent on an accurate categorization of that product in an online directory or database. Often, brick-and-mortar businesses manually create categories and accordingly classify products on digital platforms. Although being relatively precise for a single type of product, such a manual approach is increasingly inefficient and unreliable for multiple product types. As an efficient alternative to the manual approach, artificial intelligence techniques implement state-of-the-art mathematical models or algorithms to automatically create multi-level categories and classify products into those categories for generating a product hierarchy. However, no single model is capable of accurately classifying products across all given categories.

Existing models typically use a product title and description as training data to create a taxonomy for developing such multi-level categories. The product title and description are usually created manually in plain English language and can substantially differ from person to person, even for the same type of products. Due to a difference in key terms provided by the training data, conventional models fail to generate a holistic product hierarchy for a given product. Typically, historical data on previously generated categories for a similar product, or type thereof, is used to supplement the taxonomy. However, such supplementation generally falls short of capturing categories that are relevant to an underlying business objective of the product(s) indicated by the text in the corresponding training data. Moreover, conventional models provide no guidance for validating a suitability of an existing hierarchy of categories for being reused to classify the products.

A common approach used by such models to classify products into relevant categories involves extracting features from the training data. The features are extracted using a feature extraction model to generate an optimized set of features for training a classifier to perform product classification. Typically, different types of classifiers are trained on the extracted features, and the classifier that returns the best classification result is then selected to perform product classification on live data. The extracted features are specific to a type of feature extraction model used for feature extraction. Hence, a failure to extract a feature that is important for correctly classifying a product is extended to adversely affect the classifiers trained therewith, thereby hampering the accuracy of the classification result. Moreover, each classifier is typically trained and tested separately to determine its relative accuracy. This may increase the computational delay and may be inefficient.

An embodiment of present disclosure includes a system including a processer, an entity recognizer, and a model selector. The entity recognizer may be coupled to the processor and receive training data related to a product. The training data may include an attribute of the product. The model selector may also be coupled to the processor. The model selector may select a feature from the training data based on a variety of statistical feature models including a first statistical model and a second statistical model. The feature may be selected using the first statistical model to provide a first feature and the second statistical model to provide a second feature. The model selector may also train a probabilistic classifier to provide a variety of classification models including a first classification model and a second classification model. The probabilistic classifier may be trained using the first feature to provide the first classification model and the second feature to provide the second classification model. Further, the model selector may calculate an accuracy score of each of the plurality of classification models. The accuracy score may provide a measure of predicting a correct category belonging to a preset hierarchy of predefined categories for the product. The accuracy score may be calculated for each distinct category in the preset hierarchy. From the classification models, the model selector may select a classification model for each category in the preset hierarchy based on the accuracy score. The classification model may be selected for classifying the product into a most relevant category of the preset hierarchy, such that the selected classification model may have a highest accuracy score for a corresponding category in the preset hierarchy.

Another embodiment of the present disclosure may include a method for receiving, by a processor, training data related to a product. The training data may include an attribute of the product. The method may also include selecting, by the processor, a feature from the training data based on a variety of statistical feature models including a first statistical model and a second statistical model. The feature may be selected using the first statistical model to provide a first feature and the second statistical model to provide a second feature. The method may also include training, by the processor, a probabilistic classifier to provide a variety of classification models including a first classification model and a second classification model. The probabilistic classifier may be trained using the first feature to provide the first classification model and the second feature to provide the second classification model. Further, the method may include calculating, by the processor, an accuracy score of each of the variety of classification models. The accuracy score may provide a measure of predicting a correct category belonging to a preset hierarchy of predefined categories for the product. The accuracy score may be calculated for each distinct category in the preset hierarchy. Furthermore, the method may include selecting, by the processor, a classification model from the variety of classification models for each category in the preset hierarchy based on the accuracy score. The classification model may be selected for classifying the product into a most relevant category of the preset hierarchy, such that the selected classification model may have a highest accuracy score for a corresponding category in the preset hierarchy.

Yet another embodiment of the present disclosure may include a non-transitory computer readable medium comprising machine executable instructions that may be executable by a processor to receive training data related to product, where the training data may include an attribute of the product; select a feature from the training data based on a variety of statistical feature models including a first statistical model and a second statistical model, where the feature may be selected using the first statistical model to provide a first feature and the second statistical model to provide a second feature; train a probabilistic classifier to provide a variety of classification models including a first classification model and a second classification model, where the probabilistic classifier is trained using the first feature to provide the first classification model and the second feature to provide the second classification model; calculate an accuracy score of each of the variety of classification models, such that the accuracy score may provide a measure of predicting a correct category belonging to a preset hierarchy of predefined categories for the product and the accuracy score may be calculated for each distinct category in the preset hierarchy; and select a classification model from the variety of classification models for each category in the preset hierarchy based on the accuracy score, such that the classification model may be selected for classifying the product into a most relevant category of the preset hierarchy, such that the selected classification model may have the highest accuracy score for a corresponding category in the preset hierarchy.

BRIEF DESCRIPTION OF DRAWINGS

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

FIG. 5 illustrates a flow diagram for extracting features and attributes of a product, according to an example embodiment of the present disclosure.

FIG. 6 illustrates a flow diagram for replacing a term in the annotated training data, according to an example embodiment of the present disclosure.

DETAILED DESCRIPTION

Figure 1:
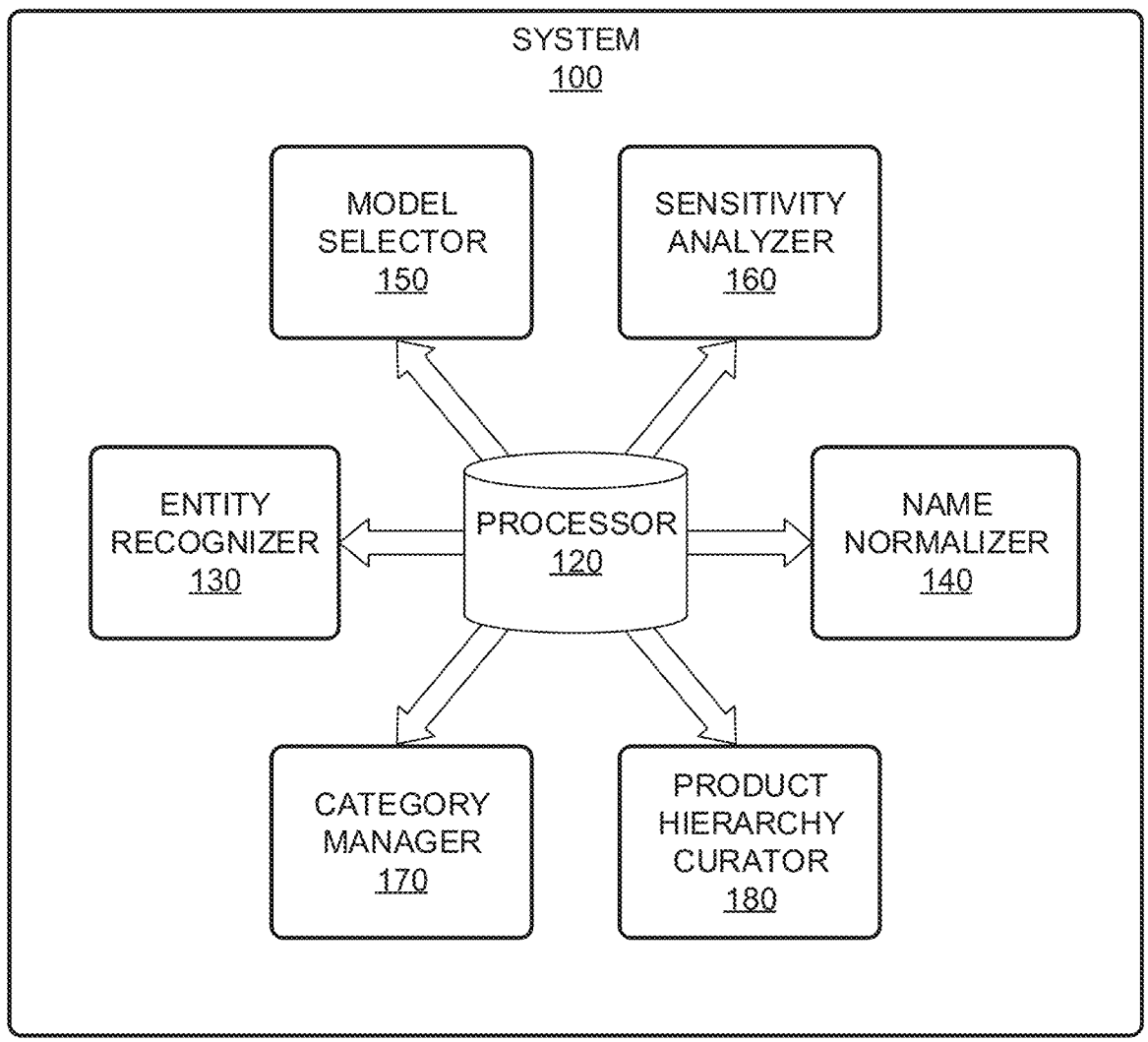
FIG. 1 illustrates a system for selecting a category-specific classification model for product classification, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being done or considered.

Various embodiments describe a selection of category-specific trained classification models for product classification. In an example, the embodiments may be implemented using a system including an entity recognizer, a category manager, a name normalizer, a model selector, a sensitivity analyzer, and a product hierarchy curator (hereinafter referred to as PH curator). The entity recognizer may receive training data related to a product. In some embodiments, the entity recognizer may also receive a hierarchy of categories related to the product. The training data may include product title and/or description, or text, providing one or more features of the product. The text may be written in a natural language. To identify the features, one or more terms in the text may be identified based on a semantic dictionary. The text may be normalized by the name normalizer to replace, eliminate, and/or reorder one or more terms in the text. Normalized text may be pre-processed and annotated based on the semantic dictionary and a language descriptor such as part-of-speech and collocation pertaining to a corresponding natural language. In an embodiment, features and/or an attribute of the product may be extracted from the annotated data. The attribute may be used to define one or more categories to create or update the category hierarchy and/or an existing product hierarchy by, for example, a category manager.

Further, the model selector may select a feature from the annotated data based on multiple statistical feature models such as tf-idf and chi-square models to provide a first feature set based on the tf-idf model and a second feature set based on the chi-square model. The first and the second feature sets may be used to train a probabilistic classifier to provide a first classification model and a second classification model respectively. For each distinct category in an available hierarchy of categories, an accuracy score of each of the first and the second classification models may be calculated. Based on the calculated accuracy score, a classification model may be selected from the trained classification models for each category, where the selected classification model may have a highest accuracy score for a corresponding category. Based on such a category-specific classification (CSC) model, the sensitivity analyzer may determine a suitability of the existing product hierarchy, or the received category hierarchy, and accordingly provide a trigger to auto-classify the product, indicate the product requiring a manual classification, and/or indicate to define a new category based on the extracted attribute.

The present disclosure describes a system that may select the CSC model for classifying a product to reduce computational lag and validate a suitability of available categories, or a hierarchy thereof, for product classification. The present disclosure may also assist to define or update relatively accurate and relevant categories for product classification based on attributes of the product. Further, the present disclosure may provide a versatile semi-automated framework that may be compatible with any product type and facilitate to accurately auto-classify an entity, such as a product, with minimal to no user intervention. Additionally, the present disclosure may uniquely assist to create personalized product hierarchies for product classifications relevant to intended product type(s) based on attributes of the product. Further, the present disclosure may facilitate better product recommendations as well as simplify and/or accelerate data-processing tasks including those related to data mining and analytics through the category-specific classification models.

Embodiments in the present disclosure are described in the context of autoclassification of products into predefined or dynamically defined categories for an e-commerce platform such as a website, online marketplace, search engine, and so on. However, it will be appreciated that the embodiments and concepts described herein may be applied in other scenarios for autoclassification of other types of entities (e.g., service, person, place, etc.) involving a natural language text. Examples of these scenarios may include, but are not limited to, pharmaceutical compound management, query management, business vertical identification, telehealth service management, inventory management, fake news and adult content detection, and 911 or emergency call analysis.

FIG. 1 illustrates a system 100 for selecting a category-specific classification model for classifying a product, according to an embodiment of the present disclosure. The system 100 may be implemented by way of a single device or a combination of multiple devices that are operatively connected or networked together. The system 100 may be implemented in hardware or a suitable combination of hardware and software. As illustrated, the system 100 may be a hardware device including a processor 120 executing machine readable program instructions to (1) communicate synchronously or asynchronously with one or more software applications, databases, storage devices, or appliances operating via same or different communication protocols, formats, database schemas, platforms or any combination thereof, (2) receive input data including training data and, in some embodiments, a hierarchy of categories related to an entity such as a product, (3) identify one or more features of the product from the training data, (4) normalize the training data to replace, eliminate, or reorder terms and/or symbols, (5) pre-process the normalized data to remove portions irrelevant for annotation, (6) annotate the pre-processed data based on a semantic dictionary and a language descriptor, (7) identify and/or extract an attribute of the product, or a feature thereof, from the annotated data, (8) define one or more categories, or a hierarchy thereof, based on the identified features and/or the attribute, (9) employ multiple statistical feature models on the identified features to extract different feature sets, each being representative of the product, (10) provide a set of distinct classification models upon training a probabilistic classifier using the extracted feature sets, (11) determine a category-specific classification (CSC) model from the set for each category based on a relative accuracy of the set of classification models, (12) determine a probability of classifying the product into a correct category based on the selected classification model for each of the categories, and (13) provide guidance to validate a suitability of CSC models, the category hierarchy, and/or an existing product hierarchy for product classification. The product hierarchy may refer to a generic hierarchy of categories related to at least one product type corresponding to one or more products to be classified. In some embodiments, the product hierarchy may be non-empty and may include a set of one or more products being previously classified therein. On the other hand, the category hierarchy may refer to an empty set of multi-level categories particularly defined for or relevant to products, or types thereof belonging to the input data and/or any received data.

The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processor 120 may include, for example, microprocessors, microcomputers, microcontrollers, digital signal processors, central processing units, state machines, logic circuits, and/or any devices that manipulate data or signals based on operational instructions. Among other capabilities, the processor 120 may fetch and execute computer-readable instructions in a memory operationally coupled with the system 100 for performing tasks such as signal coding, data processing input/output processing, power control, and/or any other functions. Any reference to a task in the present disclosure may refer to an operation being or that may be performed on data.

In an example, the processor 120 may be coupled to an entity recognizer 130, a name normalizer 140, a category manager 170, a model selector 150, a sensitivity analyzer 160, and a product hierarchy curator 180 (or PH curator 180). The entity recognizer 130 may correspond to a component for receiving the input data including training data 210 and, in some embodiments, the category hierarchy related to the product. The entity recognizer 130 may, at least one of, (1) pre-process and annotate the training data based on a semantic dictionary and a language descriptor corresponding to a particular natural language, e.g., to which the training data may pertain, (2) identify one or more features of the product from the annotated and/or normalized data, and (3) identify and/or extract the attribute of the product, or a feature thereof, from the annotated and/or normalized data.

The name normalizer 140 may correspond to a component for normalizing the annotated training data. The name normalizer 140 may, at least one of, (1) manipulate the annotated training data to replace, eliminate, and/or reorder one or more terms and symbols and (2) customize the semantic dictionary based on the identified attribute(s). Further, the category manager 170 may correspond to a component for defining or arranging a new category, e.g., in the product hierarchy or the category hierarchy, for product classification. The category manager 170 may, at least one of, (1) define a category based on the identified attribute and/or features, and (2) create or update an available hierarchy of categories based on the training data and/or the attribute.

The model selector 150 may correspond to a component for selecting a CSC model for classifying the product in a most relevant category of the category hierarchy, and, in some example embodiments, the product hierarchy. The model selector 150 may, at least one of, (1) extract distinct feature sets based on multiple statistical feature models, (2) train a probabilistic classifier using the feature sets to provide distinct classification models, (3) calculate an accuracy score of each of the classification models for each distinct category, e.g., in the category hierarchy or the product hierarchy, and (4) select a classification model from the classification models for each category of an available hierarchy of categories, such as the category hierarchy or the product hierarchy, based on the relative accuracy score of the selected classification model. Aspects of the model selector 150 provide a versatile semi-automated framework that facilitate accurately classification of products with minimal to no supervision. The provided framework is also compatible with all product types for an intended classification.

The sensitivity analyzer 160 may correspond to a component for providing guidance on validating a suitability of the determined CSC models and/or the categories in the product hierarchy or the category hierarchy used for product classification. The sensitivity analyzer 160 may, at least one of: (1) determine a probability of classifying the product into a correct category based on the selected classification model for each of the categories, e.g., in the category hierarchy or the product hierarchy; and (2) provide a trigger to auto-classify the product, indicate a review of the attribute, and/or indicate a manual classification being required for the product based on the determined probability. Unlike traditional solutions, aspects of the sensitivity analyzer 160 may provide guidance to validate a suitability of selected CSC models, the category hierarchy, and/or the product hierarchy, thereby eliminating spurious classification results. Therefore, the sensitivity analyzer 160 may uniquely assist to create a personalized product hierarchy for product classifications relevant to intended product type(s), facilitate better product recommendations, as well as simplify and/or accelerate data-processing tasks including those related to data mining and analytics.

The PH curator 180 may correspond to a component for classifying the product into a suitable available category. The PH curator 180 may, at least one of: (1) determine availability of the category hierarchy and the product hierarchy related to the product; (2) select at least one of the category hierarchy and the product hierarchy for product classification based on the respective availability and relative preset priority; and (3) auto-classify the product into a most-relevant category of the selected hierarchy of categories such as the category hierarchy and the product hierarchy.

Figure 2:
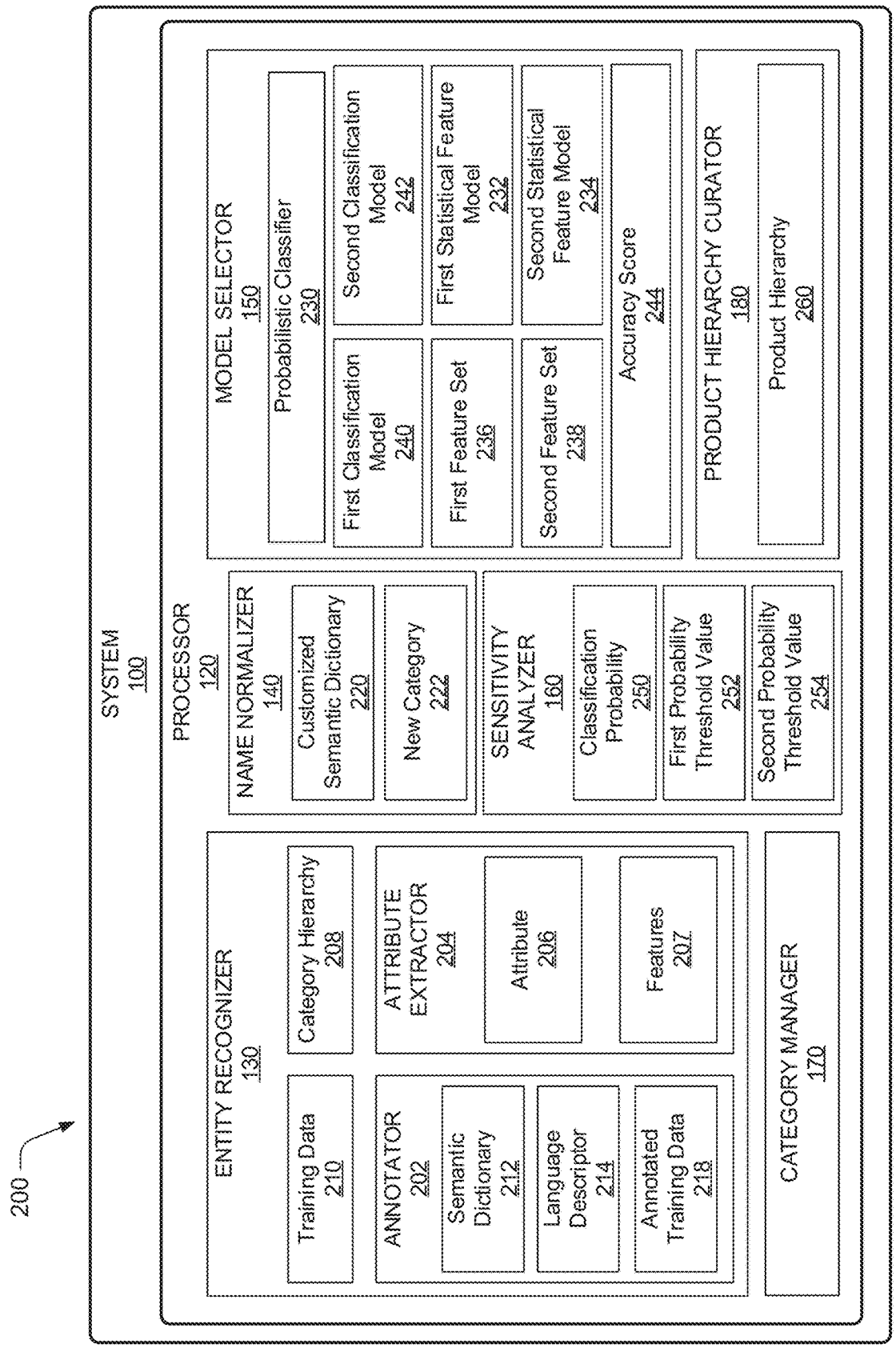
FIG. 2 illustrates components of the system of FIG. 1, according to an example embodiment of the present disclosure.
Figure 3:
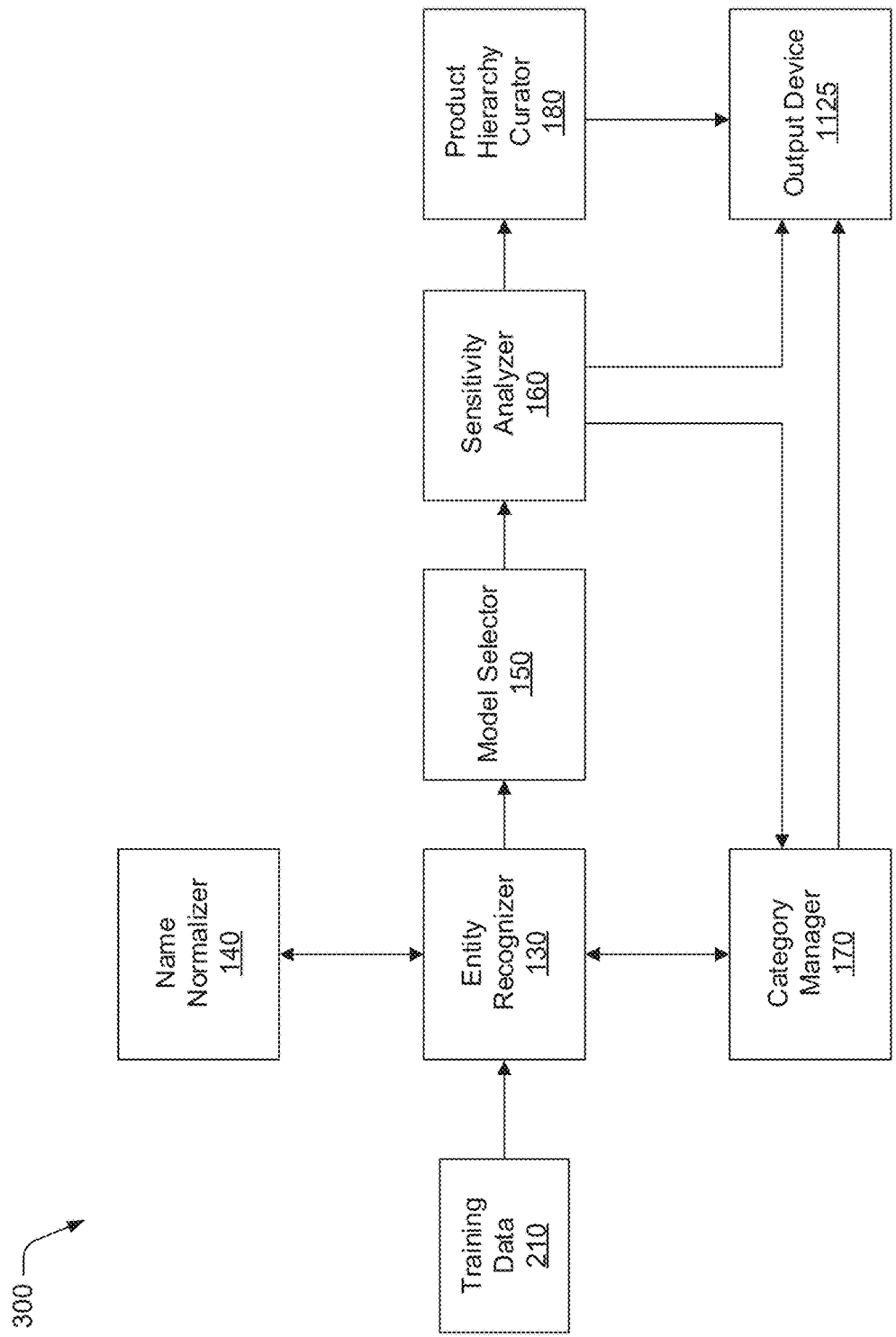
FIG. 3 illustrates an architecture for the system of FIG. 1, according to an example embodiment of the present disclosure.

FIG. 2 illustrates components of the system 100 of FIG. 1, according to an embodiment of the present disclosure. The system 100 may include one or more components that may enable selection of a trained classification model that may be specific to a corresponding category, e.g., in the category hierarchy or the product hierarchy. The classification model may be selected for each distinct category in the available hierarchy of categories. The components may also assist in validating a suitability of an available hierarchy of categories such as an existing product hierarchy for a product, or a type thereof, for being reused for classifying another product, or type thereof. For example, the system 100 may include the processor 120 coupled to one or more components such as the entity recognizer 130, the category manager 170, the name normalizer 140, the model selector 150, the sensitivity analyzer 160, and the PH curator 180. A person having ordinary skill in the art would understand that the system 100 and/or the components described herein are examples and that similar or additional systems and/or components may be employed for carrying out the functionalities related thereto described in the present disclosure. The components are discussed in conjunction with an architecture 300 for the system 100 illustrated in FIG. 3. The architecture 300 provides a workflow for the components during operation. However, any other suitable architecture 300 or related workflow may be contemplated based on the embodiments and concepts described in the present disclosure.

In an embodiment, the entity recognizer 130 may receive training data 210 from a data source, a computing device, or an electronic accessory (e.g., a digital pen, a microphone, a camera, etc.). The training data may refer to a natural language text including terms alone or in combination with a symbol or a number. The natural language text may be related to an entity such as, but not limited to, a product or object, a service, a person, and a place. For example, the training data 210 may include titles and/or descriptions, hereinafter referred to as text, of a variety of products. The text may be manually written in any natural language known in the art, related art, or developed later including English, Spanish, Hindi, Mandarin, and so on. The entity recognizer 130 may also check for availability of a group of one or more categories associated with the training data 210 for product classification. In some instances, the group may include a category having one or more sub-categories to provide a hierarchy of categories such as a category hierarchy 208. Based on the check, the entity recognizer 130 may associate an indicator, e.g., a tag or an update in a register, with the training data 210 if no such group or category hierarchy 208 may be available. However, if such group or the category hierarchy 208 may be available, the entity recognizer 130 may receive or fetch the group or the category hierarchy 208 along with the training data 210. In some instances, the category hierarchy 208, or any otherwise available categories, may be received as part of the training data 210. Other instances may include an existing product hierarchy, such as a product hierarchy 260, or another set of categories accessible by the system 100 to be reused for the training data 210.

The entity recognizer 130, in an embodiment, may receive the training data 210 and the category hierarchy 208, hereinafter also collectively referred to as input data, from a data repository, a user device, or a computer readable medium over a network via any suitable interfaces and/or devices of the system 100. The network (not shown) may include any software, hardware, or computer applications capable of providing a medium to exchange signals or data in any format known in the art, related art, or developed later. The network may include, but is not limited to, a merchant website (e.g., Amazon® (www.amazon.com), Flipkart® (www.flipkart.com), Walmart® (www.walmart.com), etc.), a unified communication application, and a standalone application. Further, the network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), Wi-Fi, radio, television, cable, satellite, and/or any other delivery or tunneling mechanism for carrying data. The network may include multiple networks or sub-networks, each of which may include, e.g., a wired or wireless data pathway. The network may include a circuit-switched voice network, a packet-switched data network, or any other network configurable to carry electronic communications. For example, the network may include networks based on the Internet protocol (IP) or asynchronous transfer mode (ATM), and may support voice using, for example, VoIP, Voice-over-ATM, or other comparable protocols used for voice, video, and data communications.

Figure 4:
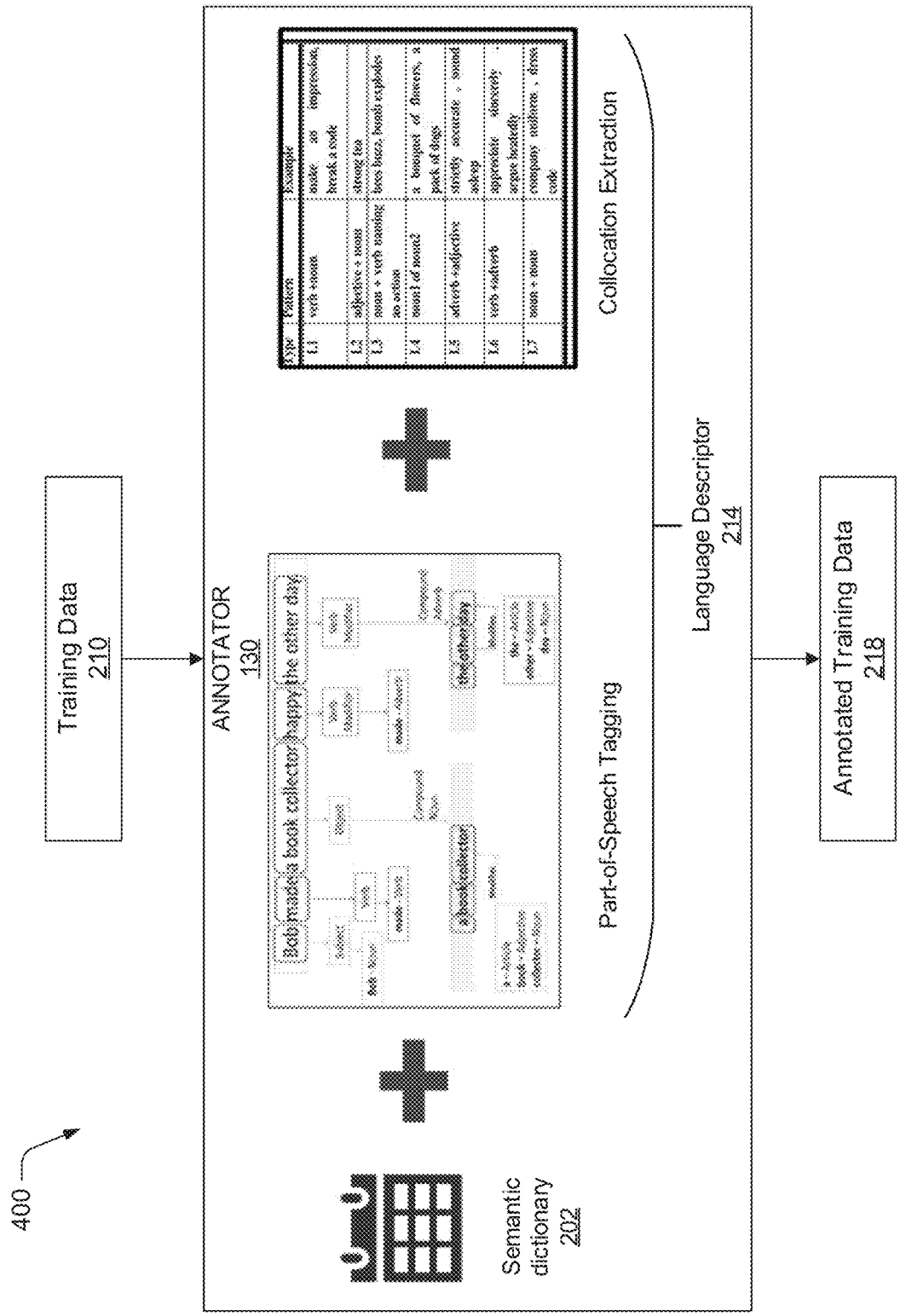
FIG. 4 illustrates a flow diagram for annotating training data related to a product, according to an example embodiment of the present disclosure.

In an embodiment, the entity recognizer 130 may include an annotator 202 and an attribute extractor 204 for processing text in the training data 210. Unlike the typical manual annotation, the training data 210 may be annotated automatically using the annotator 202. As indicated by way of FIG. 3, the annotator 202 may operate in tandem with the name normalizer 140 to provide annotated training data 218. Upon receiving the training data 210, as illustrated in FIG. 4, the annotator 202 may begin annotating the training data 210 by identifying terms in the text based on a semantic dictionary 212. A "term" may refer to (i) a letter, a word, a lexicon, and/or a phrase represented in a particular natural language, (ii) a symbol, or a combination thereof. In some instances, the term may be a combination of a term and a number. In some other instances, the term may be a pointer or reference to another term. The annotator 202 may compare the term with those in the semantic dictionary 212 to determine a natural language to which the term may pertain and interpret a meaning of the term to determine the term being related to a product.

The "semantic dictionary" may refer to a collection of one or more terms and corresponding meanings and/or correlations related to an entity such as a product or a type thereof. Accordingly, the semantic dictionary 212 may be accessible to various components of the system 100 including the entity recognizer 130, the category manager 170, and the name normalizer 140. Any suitable type of semantic dictionary 212 may be used based on a natural language(s) of the text in the training data 210. For example, the semantic dictionary 212 may be monolingual or multilingual to provide the meanings and/or correlations in a natural language that may be either same or different, respectively, relative to that of a term. For instance, a term "5K" comprising a number "5" and a letter "K" in English language may be equated in the semantic dictionary 212 to mean either "five thousand" in English language or in French language as "cinq tasses" (i.e., "five cups" in English). In another example, additionally, or alternatively, the semantic dictionary 212 may be unidimensional or multidimensional based on a contextual meaning of the term. For instance, the unidimensional semantic dictionary 212 may include a single meaning and/or correlation for a term, irrespective of a corresponding context in the text. On the other hand, the multidimensional semantic dictionary 212 may include more than one meaning or correlation for the term and may be applicable depending on a corresponding context in the training data 210. The context of a term may be determined using a variety of techniques known in the art, related art, or developed later. For instance, the context of a term may be determined based on one or more terms proximate thereto in the text and corresponding meanings in a particular natural language using any of a variety of known techniques (e.g., fuzzy logic algorithms, cosine similarity, etc.) including those related to a semantic distance between terms or phrases in the text. Based on the comparison with the semantic dictionary 212, the annotator 202 may identify the term in the text to determine the corresponding natural language and a related meaning. Subsequently, the annotator 202 may send the training data 210 to the name normalizer 140 for text normalization. Further, the annotator 202 may additionally send the training data 210 to the category manager 170 if no predefined categories or a hierarchy thereof may be available or received for the training data 210.

In an embodiment, the category manager 170 may receive the training data 210 from the annotator 202. The category manager 170 may operate in communication with various components of the system 100 to receive a request for creating additional or new categories, e.g., in the available hierarchy of categories such as the category hierarchy 208. For instance, the category manager 170 may check for an availability of the category hierarchy 208 for the training data 210. The category manager 170 may determine the availability of the category hierarchy 208 based on the indicator associated with the training data 210 by the entity recognizer 130. If the category hierarchy 208, or any individual categories, may be available, the category manager 170 may retrieve the available categories or the category hierarchy 208. However, if no predefined categories or a hierarchy thereof such as the category hierarchy 208 may be available, the category manager 170 may access, and/or retrieve, an existing product hierarchy such as the product hierarchy 260 related to a product type corresponding to the product to be classified. In a further embodiment, the category manager 170 may define new categories, such as a new category 222. One or more such new categories may be defined based on the training data 210 including features and/or attributes of the product determined by the entity recognizer 130, as discussed below in greater detail. In some embodiments, the category manager 170 may use the defined new category 222 to update an available category hierarchy 208, the product hierarchy 260, or any otherwise available categories. Other embodiments may include the category manager 170 creating a new category hierarchy based on the newly created categories using any of a variety of hierarchical categorization models known in the art, related art, or developed later. Any reference to a model in the present disclosure may refer to a mathematical representation of a task involving one or more parameters, at least one of which may correspond to a feature. The category manager 170 may communicate any of the available categories or a hierarchy thereof, including at least one of (i) the category hierarchy 208 or an updated version thereof, and (ii) the product hierarchy 260 or an updated version thereof, to the model selector 150, the sensitivity analyzer 160, and the PH curator 180.

Further, in an embodiment, the name normalizer 140 may receive the training data 210 from the annotator 202. The name normalizer 140 may normalize the text in the training data 210 based on the semantic dictionary 212. During normalization, the name normalizer 140 may manipulate the text to replace a term and/or a symbol, reorder jumbled terms, and/or eliminate a redundant term. For example, as illustrated in a flow diagram 500 in FIG. 5, at step 502, the name normalizer 140 may receive the training data 210 represented by a table T. The training data 210 may include a short text, e.g., as part of the product description. At step 504, the name normalizer 140 may compare a short text in the training data 210 with the semantic dictionary 212 to identify the short text. At step 506, if a match is found in the semantic dictionary 212, the name normalizer 140 may replace the short text with an associated expansion thereof, e.g., correlated term. For instance, the training data 210 may include acronyms "Cont" and "spec" that may be replaced with "content" and "specification" respectively provided in the semantic dictionary 212. However, if no matching term is found in the semantic dictionary 212, the name normalizer 140 may perform various operations to identify the short text.

As illustrated in a flow diagram 600 in FIG. 6, at step 602, the name normalizer 140 may receive the training data 210 represented by a table P including a new short text such as "bot" and "pk." At step 604, the name normalizer 140 may compare the new short text in the training data 210 with the semantic dictionary 212 to identify the new short text. In an embodiment, at step 606, the name normalizer 140 may create a similarity index to determine a first similarity percentage (or a corresponding score) of the new short text based on a comparison with terms in the semantic dictionary 212. The similarity index may be created using any of a variety of techniques known in the art, related art, or developed later including the cosine similarity technique. Based on the similarity index, a similarity percentage, such as the first similarity percentage, may be determined. The similarity percentage may be determined based on a comparison between letters, or an order thereof, of the new short text and terms in the semantic dictionary 212 using any of a variety of techniques known in the art. At step 608, the name normalizer 140 may compare the first similarity percentage with a predefined or dynamically defined first percentage threshold (or a corresponding score threshold), e.g., approximately 95%. At step 610, if the first similarity percentage may be equal to or greater than the first percentage threshold, the name normalizer 140 may replace the new short text with the corresponding term (or correlated term) in the semantic dictionary 212. Further, the name normalizer 140 may update the semantic dictionary 212 to include the new short text and the correlated term. In some instances, the name normalizer 140 may include the new short text and the correlated term in a new or a separate semantic dictionary to generate a customized semantic dictionary 220.

At step 612, if the first similarity percentage may be less than the first percentage threshold, the name normalizer 140 may compare the new short text with a preset language dictionary corresponding to the natural language(s) to which the new short text pertains. At step 614, the name normalizer 140 may check whether the new short text may be similar to a term in the preset language dictionary and determine a corresponding second similarity percentage (or score). Similar to the first similarity percentage, the second similarity percentage may be determined based on a comparison between letters, or an order thereof, of the new short text and terms in the preset language dictionary. The determined second similarity percentage may be compared with a predefined or dynamically defined second percentage threshold. At step 616, if the second similarity percentage may be equal to or greater than the second percentage threshold (or a corresponding score threshold), e.g., approximately 95%, the name normalizer 140 may replace the new short text in the training data 210 with a correlated term in the preset language dictionary. Else, at step 618, the name normalizer 140 may record or provide, e.g., to an output device 1125 of a computer system such as the system 100, the new short text for a user review.

Figure 7:
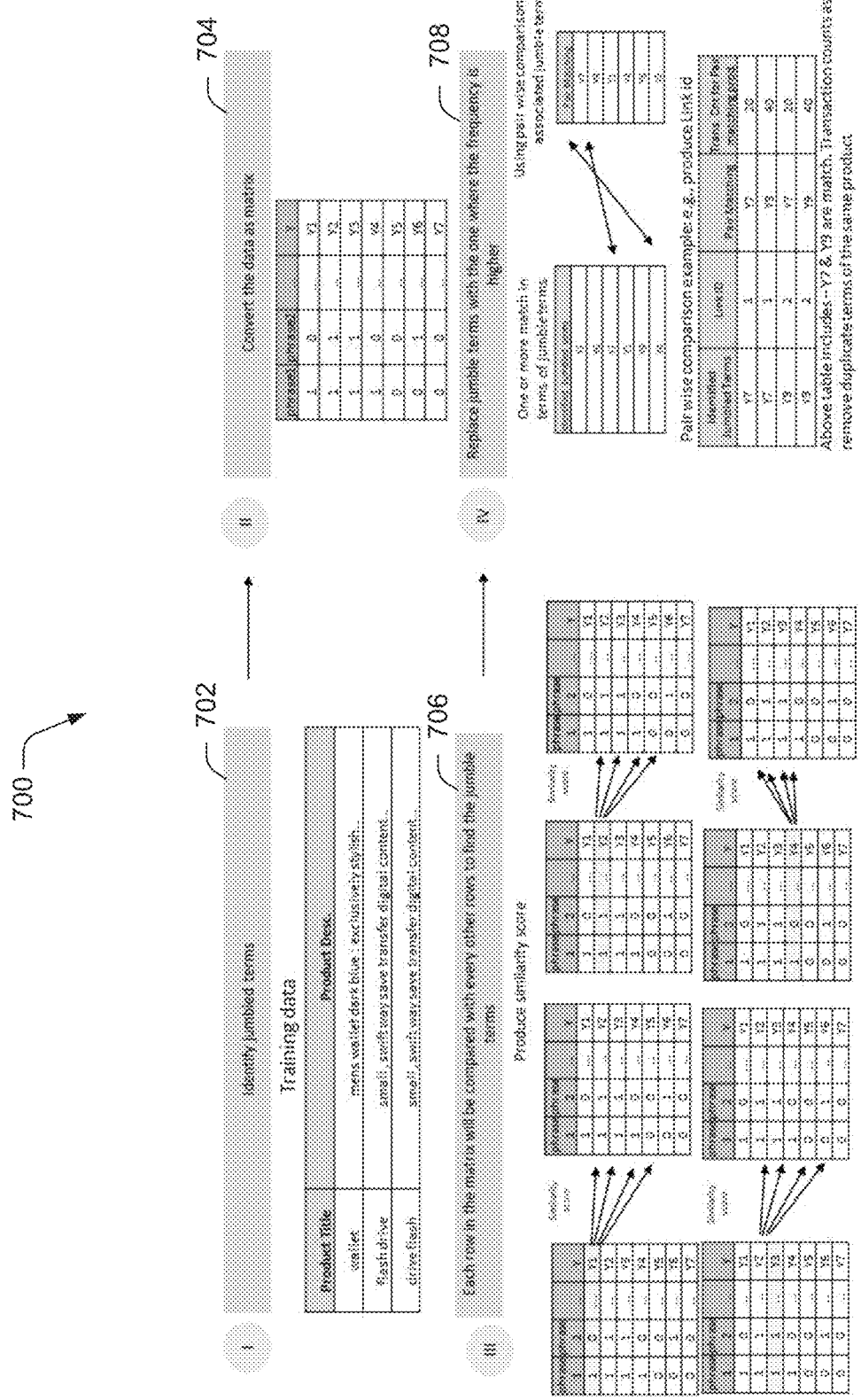
FIG. 7 illustrates a flow diagram for customizing a semantic dictionary, according to an example embodiment of the present disclosure.

In another example, as illustrated in a flow diagram 700 in FIG. 7, the name normalizer 140 may perform operations to reorder jumbled terms in the training data 210. In an embodiment, at step 702, the name normalizer 140 may identify strings that include jumbled terms (i.e., jumbled strings) in the manipulated training data or the training data 210. Such jumbled strings may be identified based on a comparison therebetween using any of a variety of techniques known in the art. For instance, the received training data may include a first string "flash drive" and a second string "drive flash." The name normalizer 140 may determine a similarity between terms of the strings based on a comparison between letters, or an order thereof, of the terms using known techniques. Based on the comparison, the name normalizer 140 may identify that the first string and the second string may be jumbled.

At step 704, the name normalizer 140 may employ any suitable technique known in the art, related art, or developed later to rearrange the strings, or reorder the terms therein. For instance, the name normalizer 140 may convert the terms in each jumbled string (e.g., phrase or sentence) into a matrix including columns and rows. Such conversion may be performed using any suitable standard feature extraction model known in the art, related art, or developed later including bag-of-words and n-gram models. Each column may correspond to a jumbled string. Each row may correspond to terms in the jumbled strings. At step 706, the name normalizer 140 may compare each row with every other row in the matrix. Based on the comparison, the name normalizer 140 may identify the jumbled terms based on relative similarities, and determine a similarity score for each term. At step 708, the name normalizer 140 may select the terms (e.g., Y1, Y4, Y5, Y6, Y7, and Y9 as illustrated in FIG. 6) that have a similarity score equal to or greater than a predefined or dynamically defined threshold. The name normalizer 140 may also compare each selected term in a string with another selected term in another string for a pairwise comparison. For example, each of the terms such as Y1, Y4, Y5, Y6, Y7, and Y9 in the first string may be compared with each of the terms such as Y1, Y4, Y5, Y6, Y7, and Y9 in the second string. Based on such pairwise comparison, the name normalizer 140 may identify a pair of similar jumbled terms recurring in different strings. Such pair of similar jumbled terms, or jumbled term-pair, may be recorded in a database using a link identifier (link ID). For example, Y7-Y7 pair as well as Y7-Y9 may be given a link ID 1 and Y9-Y7 as well as Y9-Y9 may be given a link ID 2. Upon identification, the name normalizer 140 may calculate a frequency of occurrence (or transaction counts) of each of the jumbled term-pairs. Accordingly, the jumbled term-pair having the highest frequency may be selected by the name normalizer 140. For example, the jumbled term-pair Y7-Y9 (e.g., Barbeque Burger) may have a frequency or transaction count of 40 and the jumbled term-pair Y9-Y7 (e.g., Burger Barbeque) may have a frequency of 20 in the strings. Out of the two similar jumbled term-pairs, the name normalizer 140 may select Y7-Y9 having the highest frequency to replace the jumbled-term pair Y9-Y7 in the strings.

In yet another example, the name normalizer 140 may eliminate a redundant term. For instance, the name normalizer 140 may identify redundant terms appearing in the same string based on the semantic dictionary 212 and/or the language dictionary in one or more steps. Accordingly, in a first step, the name normalizer 140 may determine redundant terms in the same string based on the corresponding similarity score, as discussed above. A term may be deemed as a redundant term based on being same as another term adjacent thereto in a string. In a second step, the name normalizer 140 may compare the redundant terms, or a set thereof including a different number of redundant terms, collectively as a single term with terms in the semantic dictionary 212. If a match is found, the name normalizer 140 may replace the redundant term with a correlated term found in the semantic dictionary 212. If there is no match, the name normalizer 140 may further compare the redundant term collectively with terms in a language dictionary corresponding to a natural language(s) to which the redundant terms may pertain. If a match is found, the name normalizer 140 may replace the redundant terms with a correlated term in the language dictionary, else the redundant terms may be manipulated to keep only a single occurrence of the term in the string. In some cases, the redundant terms may include terms provided in different natural languages but having the same meaning. Upon being normalized, the name normalizer 140 may send the normalized training data, or simply normalized data, back to the annotator 202.

The annotator 202 may receive the normalized data from the name normalizer 140. In an embodiment, the annotator 202 may pre-process the normalized data for annotation using any of a variety of natural language pre-processing techniques known in the art, related art, or developed later to provide a pre-processed data. Examples of these pre-processing techniques may include, but are not limited to, sentence tokenization, word tokenization, lemmatization, stemming, stop word removal, spell-check, and special character removal. The annotator 202 may annotate the pre-processed data based a language descriptor 214 of a particular natural language. A language descriptor such as the language descriptor 214, may refer to a rule of grammar for constructing or interpreting a meaningful phrase or sentence in a particular natural language. The annotator 202 may use such language descriptor based on the determined natural language of the terms in the text. For instance, the annotator 202 may use the language descriptor 214 including part-of-speech (POS) and collocation for annotating the pre-processed data in English language. For POS-based annotation, the annotator 202 may mark-up or tag a term in the text as corresponding to a particular POS using any of a variety of POS tagging techniques known in the art, related art, or developed later. Examples of the POS tagging techniques may include, but are not limited to, Brown Corpus, Hidden Markov Model, and Conditional Random Field (CRF) model. Further, the annotator 202 may identify collocations in the text based on the semantic dictionary 212. In some instances, the annotator 202 may perform such POS tagging based on the identified collocations in the text to provide the annotated training data 218, or simply annotated data 218. A person having ordinary skill in the art would understand that any other suitable grammar rule may be used as a language descriptor 214 for annotation. Hence, the language descriptor 214 in combination with the semantic dictionary 212 may assist to identify probable names of the products in the training data 210 and hence, reduce or eliminate human effort and time for manually annotating the text. The annotator 202 may send the annotated data 218 to the attribute extractor 204.

Figure 8:
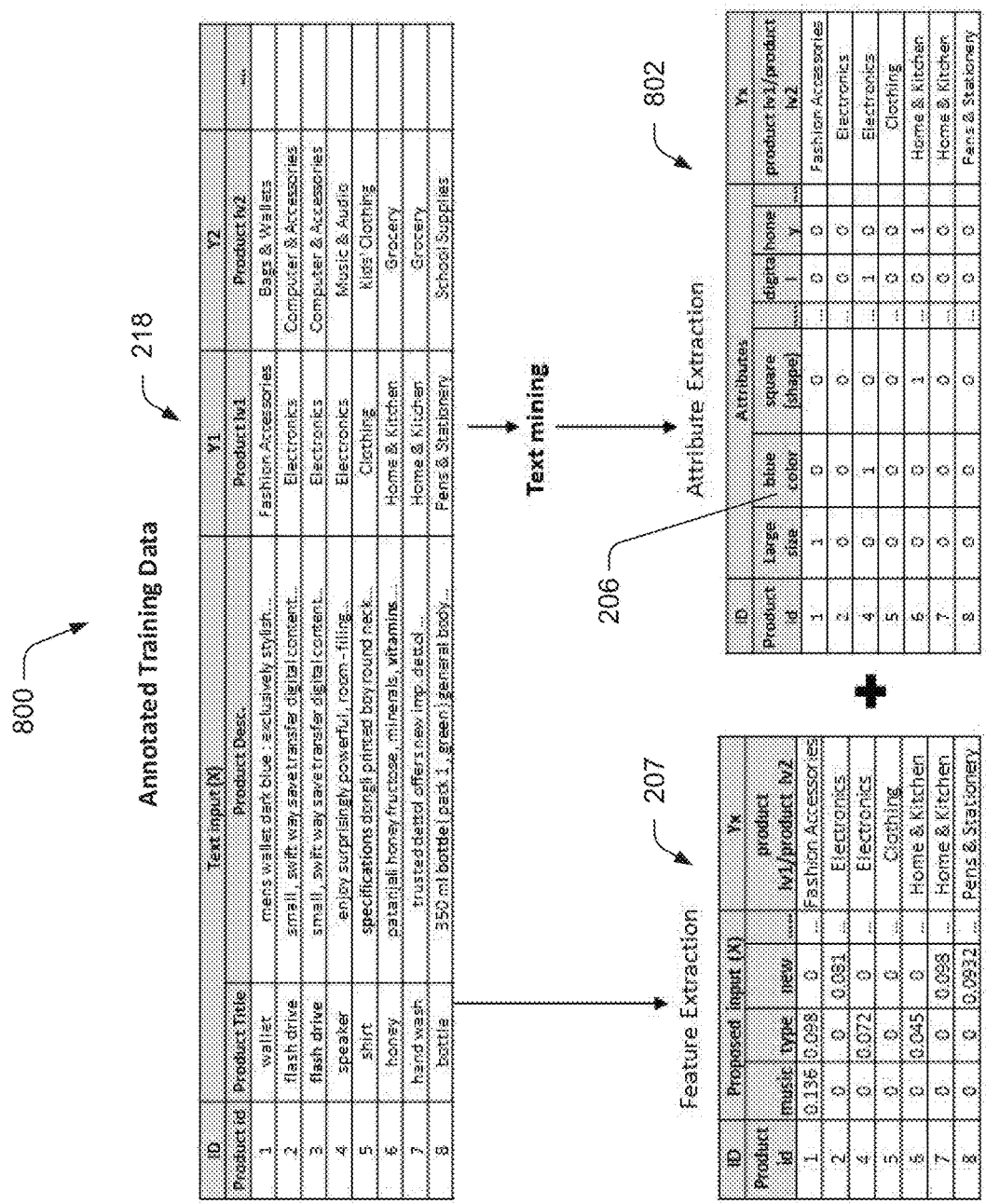
FIG. 8 illustrates a flow diagram for reordering jumbled terms in the annotated training data, according to an example embodiment of the present disclosure.

The attribute extractor 204 may receive the annotated data 218 from the annotator 202. As illustrated in a flow diagram 800 in FIG. 8, the attribute extractor 204 may identify features 207, hereinafter interchangeably referred to as general features 207, of a product from the annotated data 218. The "general feature" may refer to a term related to an entity such as the product in the annotated data 218. The attribute extractor 204 may identify and/or extract the general features 207 from the annotated data 218 using any of a variety of standard feature extraction models known in the art, related art, or developed later including the bag-of-words, collocation, and POS tagging models. For example, the attribute extractor 204 may parse text in the annotated data 218 based on an n-gram model, where the n-gram may refer to a sequence of terms in the text. For instance, a unigram may refer to a single term, a bigram may refer to a sequence of two terms, a trigram may refer to a sequence of three terms, and so on. Accordingly, the "n" in the "n-gram" may refer to the number of the grouped terms in the text. Only terms corresponding to n-grams, which may be defined in a preset natural language corpus may be modeled, instead of all possible n-grams. Such natural language corpus may refer to the American National Corpus (ANC), the Corpus of Contemporary American English (COCA), or any similar commercial or private natural language term database. In some instances, the natural language corpus may refer to a specialized natural language term database related to products, or types thereof, corresponding to the training data 210. The attribute extractor 204 may compare the terms, or corresponding n-grams, relative to those noted in the sematic dictionary 212 using the n-gram model to identify and/or extract the matched terms as the features 207. Examples of the general features 207 may include, but are not limited to, a product name (e.g., cake, brush, television, etc.), a brand name (e.g., Britannia™, Colgate™, Sony™, etc.), and a type (e.g., AAA, distilled, disposable, etc.).

In an embodiment, the attribute extractor 204 may also identify and/or extract one or more attributes 802 such as an attribute 206 (e.g., a color such as blue) of the product using the feature extraction models such as those mentioned above. The attribute 206 may refer to a term that qualifies or quantifies an entity such as the product, or a feature thereof. In some instances, the attribute 206 may also be a feature. For example, sliced, sponge, popsicle, windbreaker, bubble-wrap, etc. However, other instances may include the attribute 206 being distinct from the feature, or a type thereof. Examples of the attribute 206 may include, but are not limited to, a package type (e.g., bottle, vial, box, etc.), a flavor type (e.g., cherry, strawberry, eucalyptus, mixed fruit, etc.), a product weight (e.g., 25 g, 100 kg, 30 oz, etc.), a product size (small, large, medium, etc.), a dimension (e.g., 12.5 cm, 2.5 m×3.6 m, "55 inches", etc.), shape (round, long, flat, etc.), quantity (e.g., "pack of 10", "20 slices", "5 pairs", etc.), a pecuniary value (e.g., "$100 discount", "50% off", etc.), a color (e.g., red, yellow, blue, etc.), an offer (e.g., free, "3 per customer", "buy one get one", etc.), a rating (e.g., "5 stars", "FDA approved", "Fairtrade certified", etc.), a user type (e.g., kids, "for men", seniors, "ages 5 to 8", etc.), a format (e.g., chewable, topical, rolls, etc.), a utility (e.g., "commercial use", "indoor use", "heavy duty", "machine wash", etc.). After the general features 207 and/or attribute(s) 206 are extracted and the categories, or the category hierarchy 208, are updated, the attribute extractor 204 may communicate (i) the annotated data 218, (ii) the extracted general features 207 and/or attribute(s) 206, and (iii) the category hierarchy 208, or any otherwise available categories, to the model selector 150.

Figure 9:
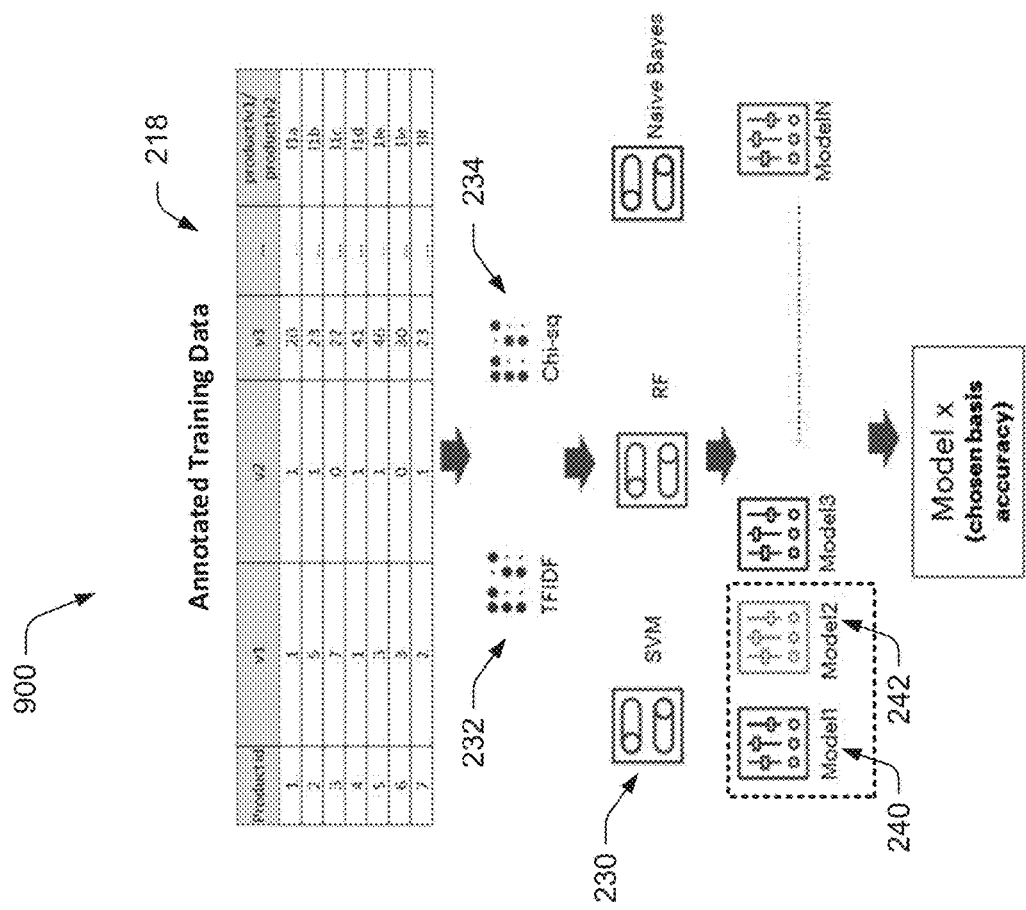
FIG. 9 illustrates a flow diagram for selecting a category-specific classification model for product classification, according to an example embodiment of the present disclosure.

The model selector 150 may operate on the annotated data 218 to select a CSC model for product classification. The model selector 150 may use the general features 207 and/or the attributes 206 of the product to extract an optimized set of features. Such an optimized feature set may include the most representative features of the products from the annotated training data 218 and may assist to reduce generalization errors caused due to common features across different products and minimize computational delay. In an embodiment, the model selector 150 may extract multiple distinct feature sets from the annotated data 218 based on different statistical feature models. However, in some embodiments, the distinct feature sets may be extracted from the extracted general features 207. In an example, as illustrated in a flow diagram 900 of FIG. 9, the model selector 150 may employ a term frequency-inverse document frequency (or tf-idf) model as a first statistical feature model 232 to extract a first feature set 236 from the annotated data 218 and/or the general features 207. The feature set 236 may include one or more features, such as the features 207 and the attributes 206, related to the product.

The tf-idf model may provide a measure of an importance of a token, e.g., feature(s) 207 or attribute 206, for a given product in a corpus such as the annotated data 218. The measured importance of the token may proportionally increase relative to the number of times the token may appear in the product; however, such measured importance may get offset by the frequency of the token in the annotated data 218. If the token occurs more frequently in a particular product but less frequently across the annotated data 218, the token may be provided with a high score for the given product as the token provides more information of the product. The importance score or the tf-idf weight may be computed for a token 't' in a product 'd' based on Equations 1 and 2. The model selector 150 may employ the tf-idf model to extract a first feature set 236.

$$Tf\text{-}idf(d,t) = tf(t) * idf(d,t) \quad (1)$$

$$idf(d,t) = \log[n/df(d,t)] + 1 \quad (2)$$

where:
tf=term frequency, e.g., a feature/attribute frequency
df=document frequency, e.g., a feature/attribute frequency in annotated data
idf=inverse document frequency, e.g., inverse of the feature/attribute frequency in the annotated data.

Similarly, the model selector 150 may employ the chi-square model as a second statistical feature model 234 to extract another distinct feature set 238 from the annotated data 218 and/or the extracted general features 207. The feature set 238 may include one or more features, such as the features 207 and the attributes 206, related to the product, such that at least one of the features therein may be distinct from those in the feature set 236. The chi-square model may provide a methodology to test the independence of two events. For example, the chi-square model may test whether an occurrence of a specific token, e.g., feature 207 or attribute 206, in a product may be independent or not of an occurrence of the product class, e.g., an available category related to the product. The chi-square model may be computed to provide a metric for a term 't' (e.g., corresponding to a feature or an attribute) in a product description 'D' (e.g., the annotated training data 218) for a product category 'c' based on Equation 3.

$$X^2(D, t, c) = \sum_{e_t \in \{0,1\}} \sum_{e_c \in \{0,1\}} \frac{(N_{e_t e_c} - E_{e_t e_c})^2}{E_{e_t e_c}} \quad (3)$$

where:
N=Observed frequency in the product description 'D'
E=Expected frequency in the product description 'D'
$e_t$=1, if the product 'D' contains the token 't,' else $e_t$=0
$e_c$=1, if the product 'D' belongs to a product category 'c,' else $e_c$=0

In the above Equation 3, $e_t$ and $e_c$ may be binary variables taking on a value '1' or '0' based on set conditions. For example, the variable $e_t$ may be equivalent to one if a term (e.g., flour) identified as a feature or an attribute in the received text may be deemed related to a product (e.g., bread) pertaining to the annotated data 218; else, $e_t$ may be equivalent to zero. Hence, $e_t$ may provide a measure of the token being related to an intended product. Similarly, the variable $e_c$ may provide a measure of whether or not the token belongs to a category related to an intended product. For example, the variable $e_c$ may be equivalent to one if a term (e.g., flour) identified as a feature or an attribute may belong to at least one of the categories (e.g. confectionary) related to a product (e.g., bread) pertaining to the annotated data 218; else, $e_c$ may be equivalent to zero. The model selector 150 may employ the chi-square model to extract a second feature set 238. A person having ordinary skill in the art would understand that any suitable statistical feature models known in the art, related art, or developed later may be, additionally or alternatively, used to extract the distinct feature sets from the annotated data 218 and/or the extracted general features 207. The extracted distinct feature sets 236, 238 may be used to train a probabilistic classifier for classifying the products.

In an embodiment, the model selector 150 may train the probabilistic classifier, such as a probabilistic classifier 230, using the distinct feature sets 236, 238 based on any of a variety of ensemble modelling techniques known the art, related art, or developed later. Examples of the ensemble modeling techniques may include, but are not limited to, stacking, blending, bagging, and boosting. Ensemble modelling may allow to aggregate a prediction of each base model (e.g., statistical feature models 232, 234) by providing a probability of correct classification and results in a final prediction for the unseen data such as a correct category for a product. For training, the probabilistic classifier 230 may be selected from any of a variety of probabilistic classifiers known in the art, related art, or developed later. As shown in the illustrated example, the probabilistic classifier 230 may be a support vector machine (SVM) classifier 230 that may be trained by the model selector 150. The SVM classifier 230 may separate different categories in the annotated data 218 with the maximum margin based on determining a hyperplane. In another example, the model selector 150 may train a random forest (RF) classifier that may operate by constructing multiple decision trees during training to output a category, which may be a mode of categories predicted from an individual decision tree. In yet another example, the model selector 150 may train a Naïve Bayes classifier that uses a probabilistic model based on an assumption that each token (e.g., feature(s) 207 or attribute 206) may be independent of another token. Other examples may include multiple probabilistic classifiers such as those mentioned above being trained using the model selector 150.

The probabilistic classifier 230 may be trained using more than one type of distinct feature sets 236, 238, thereby allowing to capture most relevant features and/or attribute(s) 206 of the products and assist in accurate product classification. Each probabilistic classifier 230 may be trained on different feature sets 236, 238 to provide a group of trained classification models. For example, the probabilistic classifier 230 may provide a first trained classification model 240 based on the feature set 236 obtained using the tf-idf model and a second trained classification model 242 based on another feature set 238 obtained using the chi-square model. Further, the model selector 150 may calculate an accuracy score 244 of each of the trained classification models 240, 242. The accuracy score 244 may provide a measure of predicting a correct category for the products. The "correct category" may refer to a category for which the accuracy score 244 of multiple trained classification models may be about the same or approximately 100%. In some instances, the correct category may be a category for which the accuracy scores 244 of all of the trained classification models may be about the same or approximately 100%. In other some instances, the correct category may be deemed as an absolute fit for an entity such as a product. In the present disclosure, the terms "about" and "approximately" refer to variations of up to +/−5% of an associated number.

The accuracy score 244 may be calculated based on testing of the corresponding training classification model.

For example, the model selector 150 may use a trained classification model, such as the first classification model 240 or the second classification model 242, to predict a category for each product in the annotated data 218 before testing. The predicted category may be recorded for calculating the accuracy score 244. Subsequently, the trained classification model may be tested on a testing data, which may be a subset of the annotated data 218 provided by the entity recognizer 130. During testing, the model selector 150 may determine a category for each of the products using the trained classification model. The model selector 150 may then compare a determined category with a corresponding predicted category for each trained classification model. Such comparison may be performed by the model selector 150 for each of the trained classification models to determine a relative accuracy of the trained classification model. The model selector 150 may compute an accuracy score 244 of the trained classification model based on Equation 4.

$$F1 = \frac{2*TP}{2*TP+FP+FN} \quad (4)$$

where:
F1=accuracy score of a trained classification model
TP=true positive
FP=false positive
FN=false negative In Equation 4, TP may provide a measure of the determined category being same as the predicted category upon being calculated by a trained classification model. In some instances, TP may provide a measure of the determined category and the predicted category being the correct category. On the other hand, FP and FN may provide a measure of the determined category being different from the predicted category upon being calculated by a trained classification model. In some instances, FP may provide a measure of the predicted category being determined as the correct category and the determined category not being the correct category. Similarly, in some instances, FN may provide a measure of the determined category being determined as the correct category and the predicted category not being the correct category.

In an embodiment, the model selector 150 may select a trained classification model, such as model x, for each category. Unlike the traditional solution that applies a single classification model uniformly across all categories, the model selector 150 may uniquely select a trained classification model specific to a corresponding category. The trained classification model (or CSC model) may be selected for each distinct category based on a relative accuracy score. For example, the selected CSC model may have the highest accuracy score for the corresponding category. In some embodiments, a specific trained classification model may be selected for each distinct category in a predefined level of an available hierarchy of categories such as the category hierarchy 260 communicated by the category manager 170. Such selection of the CSC model for each of the categories may assist to improve the accuracy of product classification relative to a suitability of available categories, or a hierarchy thereof such as the category hierarchy 208. The model selector 150 may communicate the obtained CSC models for each of the categories, e.g., in the category hierarchy 208, and the testing data to the sensitivity analyzer 160.

Figure 10:
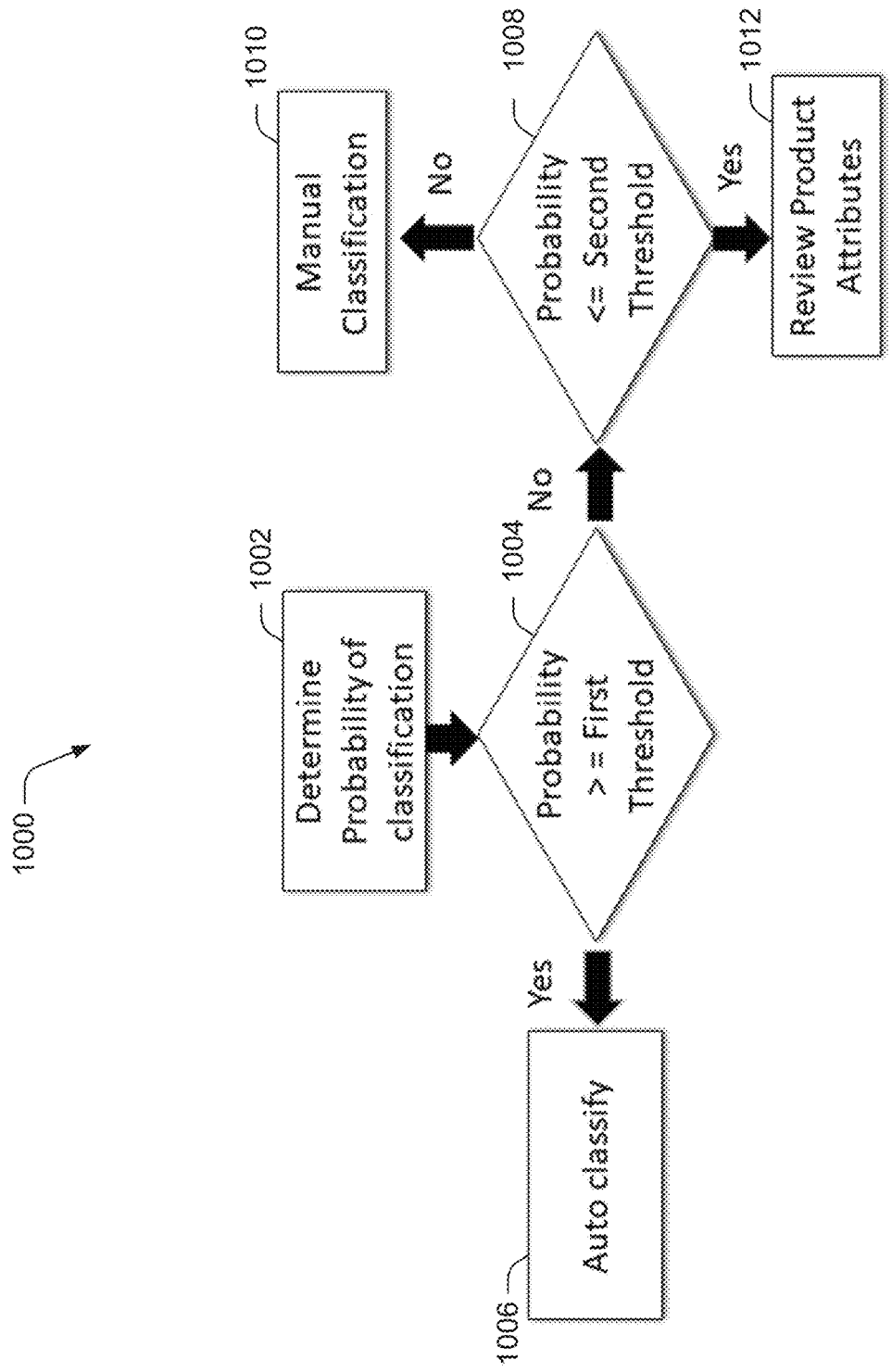
FIG. 10 illustrates a flow diagram for validating a preset hierarchy of categories for product classification, according to an example embodiment of the present disclosure.

The sensitivity analyzer 160 may receive the obtained CSC models to perform operations on the testing data or live dataset related to the products to be classified. As illustrated in a flow diagram 1000 in FIG. 10, the sensitivity analyzer 160 may perform product classification based on the CSC models and the attributes, such as the attribute 206, of the product. Each of the CSC models may be conditioned based on the type of ensemble modelling technique used for training the probabilistic classifier 230 to provide a probability of classifying a product in the correct category, hereinafter referred to as classification probability 250. In an embodiment, at step 1002, the sensitivity analyzer 160 may run the CSC models on the received dataset to determine the corresponding classification probability 250 for each available category. At step 1004, the sensitivity analyzer 160 may compare the obtained classification probability 250 for each of the CSC models with a predefined or dynamically defined first probability threshold 252. Based on a CSC model for which the classification probability 250 may be equal to or greater than the first probability threshold 252, at step 1006, the sensitivity analyzer 160 may invoke the PH curator 180 to auto-classify the product in the corresponding category of the CSC model.

The PH curator 180, in communication with the category manager 170, may determine availability of the category hierarchy 208 or the product hierarchy 260, or any updated versions thereof, related to the product. Based on the availability, in an example, the PH curator 180 may select the category hierarchy 208 upon being available, else the product hierarchy 260. In another example, the category hierarchy 208 may have a higher priority for being selected relative to the existing product hierarchy 260. Hence, if both the hierarchies 208, 260 may be available, the PH curator 180 may select the category hierarchy 208 over the product hierarchy 260. Other examples may include the product hierarchy 260 having a higher priority than the category hierarchy 208 and hence, the product hierarchy 260 may be selected by the PH curator 180 when both of those may be available. Further, a person having ordinary skill in the art will be able to appreciate that the PH curator 180 may retrieve only an updated version of the selected hierarchy of categories from the available hierarchies such as the category hierarchy 208 and the product hierarchy 260. Such an updated version may include at least one of the underlying categories being updated or replaced based on the attribute(s) of the product. The PH curator 180 may accordingly auto-classify the product into an appropriate category of the selected hierarchy of categories such as the category hierarchy 208 using any of the known techniques including k-means and hierarchical clustering algorithms. In an example, the PH curator 180 may identify similar products by respective names, the attributes 206, and/or the features 207 thereof to map the products into appropriate categories based on the corresponding CSC model for which the classification probability 250 may be equal to or greater than the first probability threshold 252. Hence, the classification probability 250 being above the first probability threshold 252 may assist to verify that the corresponding CSC model may be effective in correctly classifying the products and that appropriate categories may be available, e.g., in the category hierarchy 208 or the product hierarchy 260, for product classification.

If the obtained classification probability 250 may be less than the first probability threshold 252, at step 1008, the sensitivity analyzer 160 may compare the classification probability 250 with a predefined or dynamically defined second probability threshold 254. The second comparison may be performed for each CSC model for which the classification probability 250 may be less than the first probability threshold 252. Based on a comparison with the second probability threshold 254, the sensitivity analyzer 160 may perform various operations.

For each CSC model having the corresponding classification probability 250 being greater than the second probability threshold 254, at step 1010, the sensitivity analyzer 160 may identify the product based on the corresponding features and provide, e.g., to the output device 1125 of a computer system such as the system 100, the identified product for a manual classification. The classification probability 250 exceeding the second probability threshold 254 may indicate that the received product features may be insufficient for the corresponding CSC model to correctly classify the product. Such exceeding classification probability 250, hence, may also help validate that an appropriate category for classifying the product may be available, e.g., in the available hierarchy of categories such as the category hierarchy 208 and the product hierarchy 260.

On the other hand, if the classification probability 250 may be less than or equal to the second probability threshold 254, at step 1012, the sensitivity analyzer 160 may provide, e.g., to the output device 1125, the corresponding attribute 206 of the product for user review. The classification probability 250 not exceeding the second probability threshold 254 may validate unavailability of an appropriate category, e.g., in the available hierarchy of categories such as the category hierarchy 208, to correctly classify the product. Accordingly, in some instances, the sensitivity analyzer 160 may invoke the category manager 170 to define one or more new categories based on the corresponding attributes 206. In some instances, the sensitivity analyzer 160 may also invoke the model selector 150 to determine a new CSC model for each of the newly defined categories, as discussed above.

Figure 11:
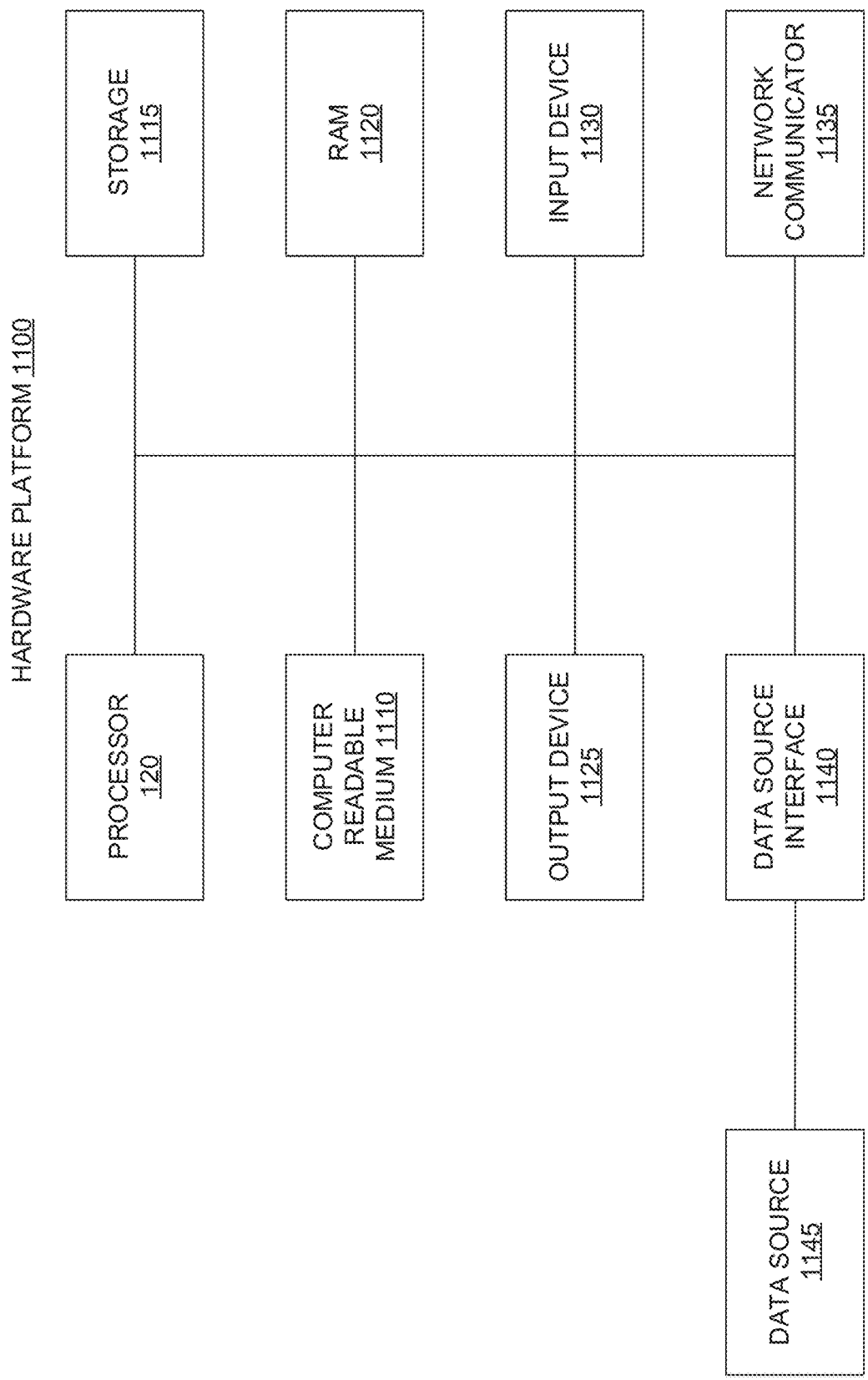
FIG. 11 illustrates a hardware platform for an implementation of the system of FIG. 1, according to an example embodiment of the present disclosure.

FIG. 11 illustrates a hardware platform 1100 for the implementation of the system 100 of FIG. 1, according to an embodiment of the present disclosure. For the sake of brevity, construction and operational features of the system 100 which are explained in detail above are not explained in detail herein. Particularly, computing machines such as but not limited to internal/external server clusters, quantum computers, desktops, laptops, smartphones, tablets, and wearables which may be used to execute the system 100 or may have the structure of the hardware platform 1100. As illustrated, the hardware platform 1100 may include additional components not shown and that some of the components described may be removed and/or modified. For example, a computer system with multiple GPUs may be located on external-cloud platforms including Amazon Web Services, or internal corporate cloud computing clusters, or organizational computing resources, etc.

The hardware platform 1100 may be a computer system such as the system 100 that may be used with the embodiments described herein. The computer system may represent a computational platform that includes components that may be in a server or another computer system. The computer system may execute, by the processor 120 (e.g., a single or multiple processors) or other hardware processing circuit, the methods, functions and other processes described herein. These methods, functions and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the processor 120 that executes software instructions or code stored on a non-transitory computer-readable storage medium 1110 to perform methods of the present disclosure. The software code includes, for example, instructions to gather data and documents and analyze documents. In an example, the entity recognizer 130, the name normalizer 140, the category manager 170, the model selector 150, the sensitivity analyzer 160, and the PH curator 180 may be software codes or components performing these steps.

The instructions on the computer-readable storage medium 1110 are read and stored the instructions in storage 1115 or in random access memory (RAM). The storage 1115 may provide a space for keeping static data where at least some instructions could be stored for later execution. The stored instructions may be further compiled to generate other representations of the instructions and dynamically stored in the RAM such as RAM 1120. The processor 120 may read instructions from the RAM 120 and perform actions as instructed.

The computer system may further include the output device 1125 to provide at least some of the results of the execution as output including, but not limited to, visual information to users, such as external agents. The output device 1125 may include a display on computing devices and virtual reality glasses. For example, the display may be a mobile phone screen or a laptop screen. GUIs or text may be presented as an output on the display screen. The computer system may further include an input device 1130 to provide a user or another device with mechanisms for entering data and/or otherwise interact with the computer system. The input device 1130 may include, for example, a keyboard, a keypad, a mouse, or a touchscreen. Each of these output device 1125 and input device 1130 may be joined by one or more additional peripherals. For example, the output device 1125 may be used to display results of the entity recognizer 130, the name normalizer 140, the category manager 170, the model selector 150, the sensitivity analyzer 160, and/or the PH curator 180.

A network communicator may be provided to connect the computer system to a network and in turn to other devices connected to the network including other clients, servers, data stores, and interfaces, for instance. A network communicator may include, for example, a network adapter such as a LAN adapter or a wireless adapter. The computer system may include a data source interface 1140 to access the data source 1145. The data source 1145 may be an information resource. As an example, a database of exceptions and rules may be provided as the data source 1145. Moreover, knowledge repositories and curated data may be other examples of the data source 1145.

Figure 12:
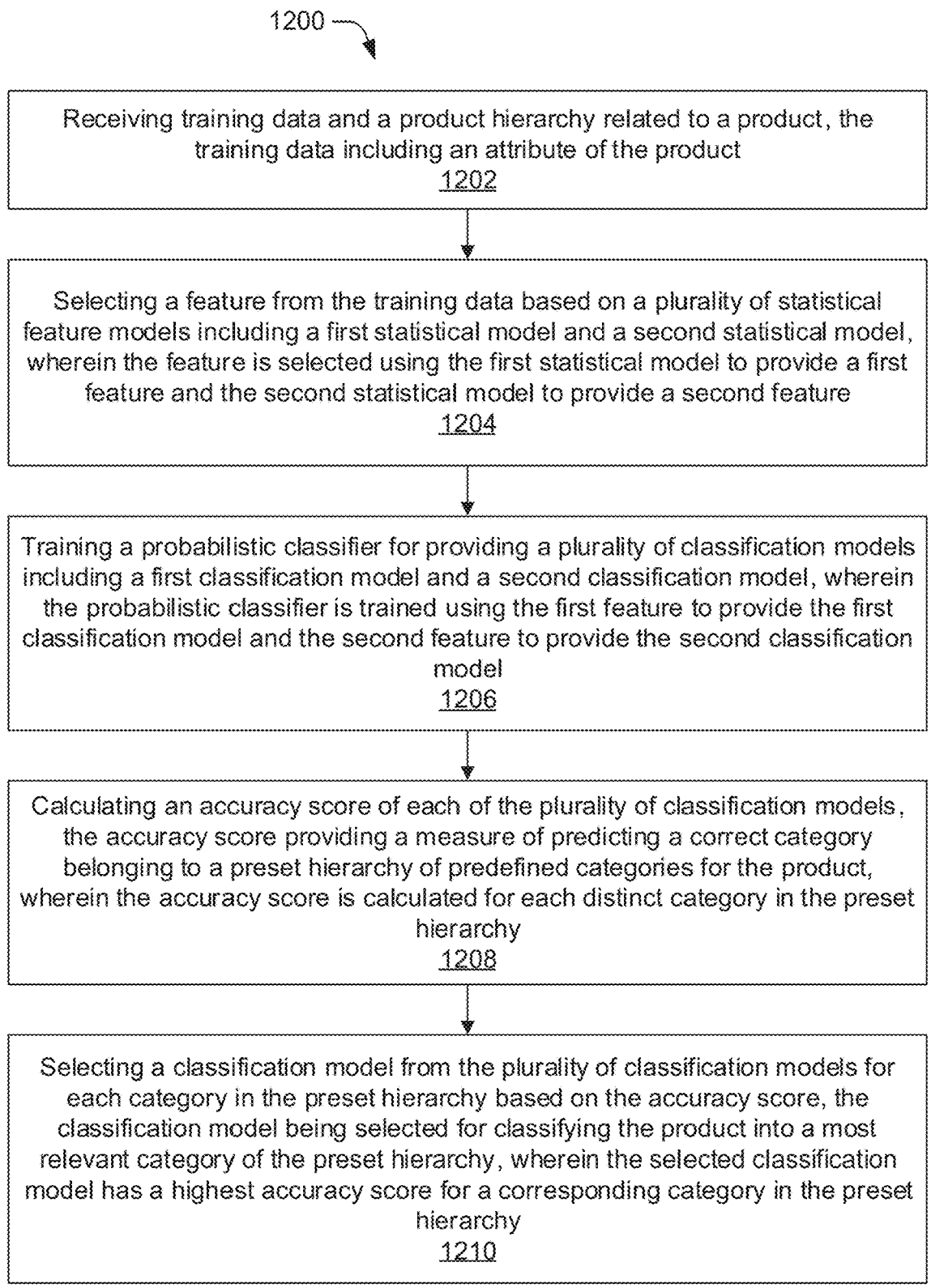
FIG. 12 illustrates a method for selecting a category-specific classification model for product classification, according to an example embodiment of the present disclosure.

FIG. 12 illustrates a method 1200 for selecting a CSC model for product classification, according to an embodiment of the present disclosure. The method 1200 may be described in the general context of computer executable instructions. Generally, computer executable instructions may include routines, programs, objects, components, data structures, procedures, modules, functions, and the like that perform particular functions or implement particular abstract data types. The computer executable instructions may be stored on a computer readable medium, and installed or embedded in an appropriate device for execution.

The order in which the method 1200 is described is not intended to be construed as a limitation, and any number of the described method blocks may be combined or otherwise performed in any order to implement the method 1200, or an alternate method. Additionally, individual blocks may be deleted from the method 1200 without departing from the spirit and scope of the present disclosure described herein.

Furthermore, the method 1200 may be implemented in any suitable hardware, software, firmware, or combination thereof, that exists in the related art or that is later developed.

The method 1200 describes, without limitation, implementation of the system 100. A person of skill in the art will understand that the method 1200 may be modified appropriately for implementation in various manners without departing from the scope and spirit of the disclosure. The method 1200 may be implemented, in at least some embodiments, by the model selector 150 of the system 100. For example, the model selector 150 may use the processor(s) to execute computer instructions to perform operations for selecting CSC models for product classification.

At step 1202, training data related to a product and a hierarchy of categories such as the category hierarchy 208 may be received, e.g., by the entity recognizer 130. In an embodiment, the training data 210 may include text corresponding to product title and/or description. The text may be written in a natural language such as the English language. The text may include terms related to the product and correspond to features of the products. In an embodiment, the text may be normalized to replace, eliminate, or reorder terms and/or symbols therein, e.g., by the name normalizer 140 operating in tandem with the entity recognizer 130. The normalized text may be pre-processed to remove portions irrelevant for annotation. The pre-processed text may be annotated based on the semantic dictionary 212 and the language descriptor 214 to provide the annotated data 218. Further, an attribute such as attribute 206 of the product, or a feature thereof, may be extracted from the annotated data 218. The attribute 206 may refer to a term that may qualify or quantify the product or a feature thereof. In some instances, the attribute 206 may also be a feature. The extracted features and/or attributes may be used to define or update categories, e.g., in the available hierarchy of categories such as the category hierarchy 208, or the product hierarchy 260, by the category manager 170.

At step 1204, a feature may be selected from various features of the product in the training data. In an embodiment, the feature may be selected from training data such as the annotated training data 218 based on multiple statistical feature models such as tf-idf and chi-square models. For example, the feature, upon being selected based on the first statistical model 232 (e.g., tf-idf model), may provide the first feature set 236 and based on the second statistical model 234 (e.g., chi-square model) may provide the second feature set 238.

At step 1206, a probabilistic classifier may be trained. The probabilistic classifier 230 may be trained using the first feature set 236 and the second feature set 238. Upon being trained using the first feature set 236, the probabilistic classifier 230 may provide a first classification model 240. Similarly, upon being trained using the second feature set 238, the probabilistic classifier 230 may provide a second classification model 242.

At step 1208, an accuracy score may be calculated. The accuracy score 244 of each of the first classification model 240 and the second classification model 242 may be calculated. The accuracy score 244 may provide a measure of predicting a correct category, e.g., belonging to the available hierarchy of categories such as the category hierarchy 208 for the product. The accuracy score 244 may be calculated for each distinct category in the category hierarchy 208.

At step 1210, a CSC model may be selected. The selection may be performed from the available trained classification models such as the first classification model 240 and the second classification model 242. The CSC model may be selected for each category in the category hierarchy 208 based on the relative accuracy score for classifying the product into a most relevant category of the category hierarchy 208. The selected classification model may have the highest accuracy score for a corresponding category in the category hierarchy 208. The "most relevant category" as used herein may refer to a category for which a corresponding trained classification model has the highest relative accuracy score across a group of trained classification models for various categories, e.g., in the category hierarchy 208. In some instances, the most relevant category may be deemed as a best available fit for an entity such as a product.

Subsequently, the selected CSC model for each category may be stored for later use by, for example, the sensitivity analyzer. During operation, the selected CSC model for each of the categories may be used to auto-classify the products into a most relevant category, e.g., of the selected hierarchy of categories such as the category hierarchy 208 or the product hierarchy 260 based on respective availability and relative preset priority. In some embodiments, the most relevant category may be the correct category for product classification based on the correct category being available, e.g., in the category hierarchy 208.

The present disclosure describes the system 100 that may select the CSC model for classifying a product to reduce computational lag and validate a suitability of available categories, or a hierarchy thereof such as the category hierarchy 208 and the product hierarchy 260, for product classification. The present disclosure may also assist to define or update relatively accurate and relevant categories for product classification based on attributes 206 of the product. Further, the present disclosure may provide a versatile semi-automated framework that may be compatible with any product type and facilitate to accurately classify an entity, such as a product, with minimal to no user intervention. Additionally, the present disclosure may uniquely assist to create personalized product hierarchies for product classifications relevant to intended product type(s) based on attributes 206 of the product. Further, the present disclosure may facilitate better product recommendations as well as simplify and/or accelerate data-processing tasks including those related to data mining and analytics through the category-specific classification models.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
   a processor;
   an entity recognizer coupled to the processor, the entity recognizer to receive training data and a category hierarchy related to a product from a user device over a network, the training data including an attribute of the product;
   a model selector coupled to the processor, the model selector to:
   extract a first feature and a second feature from the training data based on a plurality of statistical feature models including a first statistical model and a second statistical model, wherein the first and second features indicate the most representative features of the products among the training data for the corresponding statistical model, wherein each of the first feature and the second feature includes any one or a combination of a name of product, a brand name of the product, and a type of product, wherein the first feature is extracted using the first statistical model and the second feature is extracted using the second statistical model, wherein the first statistical model indicates a measure of importance of attribute of the product;

train a probabilistic classifier to provide a plurality of classification models including a first classification model and a second classification model, wherein the probabilistic classifier is trained using the first feature to provide the first classification model and using the second feature to provide the second classification model;

calculate an accuracy score of each of the plurality of classification models, the accuracy score providing a measure of predicting a correct category belonging to a preset hierarchy of predefined categories for the product, wherein the accuracy score is calculated for each distinct category in the preset hierarchy; and select a classification model from the plurality of classification models for each category in the preset hierarchy based on the accuracy score, the classification model being selected for classifying the product into a most relevant category of the preset hierarchy, wherein the selected classification model has a highest accuracy score for a corresponding category in the preset hierarchy;

a product hierarchy curator coupled to the processor, the product hierarchy curator to:
determine a probability of classifying the product into a correct category based on the selected classification model to validate a suitability of selected classification model; and a sensitivity analyzer coupled to the processor, the sensitivity analyzer to:
based on the determined probability, auto-classify the product in a category of the category hierarchy; and
provide results of the classification to an output device.

2. The system as claimed in claim 1, wherein the sensitivity analyzer to:
compare the probability with a set of one or more predefined threshold values including a first threshold value and a second threshold value; and
perform an action on the training data based on the comparison, wherein the action includes, at least one of, triggering a classification of the product into the most relevant category when the probability is equal to or greater than the first threshold value, indicating the product corresponding to the selected feature for manual classification into the most relevant category in the preset hierarchy when the probability is between the first threshold value and the second threshold value, and indicating a review of the attribute when the probability is less than or equal to the second threshold value.

3. The system as claimed in claim 1, wherein the entity recognizer further comprises:

an annotator to annotate the training data based on a predefined semantic dictionary related to the product and at least one of a part-of-speech and a collocation in the training data; and an attribute extractor to identify the attribute from the annotated training data based on a feature identification model.

4. The system as claimed in claim 1, further comprising a name normalizer and a category manager coupled to the processor, the name normalizer to, at least one of,
manipulate the training data based on one of a predefined semantic dictionary related to the product and a language dictionary, wherein the training data is manipulated to, at least one of, replace one of a term and a symbol, eliminate a redundant term, and reorder jumbled terms therein; and
customize the predefined semantic dictionary based on the manipulated training data; and the category manager to, at least one of,
create the preset hierarchy of predefined categories based on the manipulated training data; and
define a category in the preset hierarchy based on one of the feature and the attribute of the product.

5. The system as claimed in claim 1, wherein the training data further includes at least one of a name and a description of the product.

6. The system as claimed in claim 1, wherein the attribute is distinct from the feature, and wherein the attribute includes a product type, a weight, a flavor type, a package type, a size, a dimension, a shape, a quantity, a pecuniary value, a color, an offer, a rating, a user type, a format, a utility, or a combination thereof, corresponding to the product.

7. The system as claimed in claim 1, wherein the classification model is selected for each category in a predefined level of the preset hierarchy.

8. A method comprising:
receiving, by a processor, training data and a category hierarchy related to a product from a user device over a network, the training data including an attribute of the product;

extracting, by the processor, a first feature and a second feature from the training data based on a plurality of statistical feature models including a first statistical model and a second statistical model, wherein the first and second features indicate the most representative features of the products among the training data for the corresponding statistical model, wherein each of the first feature and the second feature includes any one or a combination of a name of product, a brand name of the product, and a type of product, wherein the first feature is extracted using the first statistical model to and the second feature is extracted using the second statistical model, wherein the first statistical model indicates a measure of importance of attribute of the product;

training, by the processor, a probabilistic classifier to provide a plurality of classification models including a first classification model and a second classification model, wherein the probabilistic classifier is trained using the first feature to provide the first classification model and using the second feature to provide the second classification model;

calculating, by the processor, an accuracy score of each of the plurality of classification models, the accuracy score providing a measure of predicting a correct category belonging to a preset hierarchy of predefined categories for the product, wherein the accuracy score is calculated for each distinct category in the preset hierarchy;

selecting, by the processor, a classification model from the plurality of classification models for each category in the preset hierarchy based on the accuracy score, the classification model being selected for classifying the product into a most relevant category of the preset hierarchy, wherein the selected classification model has a highest accuracy score for a corresponding category in the preset hierarchy;

determining, by the processor, a probability of classifying the product into a correct category based on the selected classification model to validate a suitability of selected classification model;

based on the determined probability, auto-classifying, by the processor, the product in a category of the category hierarchy; and providing, by the processor, results of the classification to an output device.

9. The method as claimed in claim 8, further comprising:
comparing, by the processor, the probability with a set of one or more predefined threshold values including a first threshold value and a second threshold value; and
performing, by the processor, an action on the training data based on the comparison, wherein the action includes, at least one of, triggering a classification of the product into the most relevant category when the probability is equal to or greater than the first threshold value, indicating the product corresponding to the selected feature for manual classification into the most relevant category in the preset hierarchy when the probability is between the first threshold value and the second threshold value, and indicating a review of the attribute when the probability is less than or equal to the second threshold value.

10. The method as claimed in claim 8, wherein the receiving further comprises:
annotating, by the processor, the training data based on a predefined semantic dictionary related to the product and at least one of a part-of-speech and a collocation in the training data; and
identifying, by the processor, the attribute from the annotated training data based on a feature identification model.

11. The method as claimed in claim 8, further comprising, at least one of:
manipulating, by the processor, the training data based on one of a predefined semantic dictionary related to the product and a language dictionary, wherein the training data is manipulated to, at least one of, replace one of a term and a symbol, eliminate a redundant term, and reorder jumbled terms therein;
customizing, by the processor, the predefined semantic dictionary based on the manipulated training data;
creating, by the processor, the preset hierarchy of predefined categories based on the manipulated training data; and
defining, by the processor, a category in the preset hierarchy based on one of the feature and the attribute of the product.

12. The method as claimed in claim 8, wherein the training data further includes at least one of a name and a description of the product.

13. The method as claimed in claim 8, wherein the attribute is distinct from the feature, and wherein the attribute includes a product type, a weight, a flavor type, a package type, a size, a dimension, a shape, a quantity, a pecuniary value, a color, an offer, a rating, a user type, a format, a utility, or a combination thereof, corresponding to the product.

14. The method as claimed in claim 8, wherein the classification model is selected by the processor for each category in a predefined level of the preset hierarchy.

15. A non-transitory computer readable medium comprising machine executable instructions that are executable by a processor to:
receive training data and a category hierarchy related to product from a user device over a network, the training data including an attribute of the product;
extract a first feature and a second feature from the training data based on a plurality of statistical feature models including a first statistical model and a second statistical model, wherein the first and second features indicate the most representative features of the products among the training data for the corresponding statistical model, wherein each of the first feature and the second feature includes any one or a combination of a name of product, a brand name of the product, and a type of product, wherein the first feature is extracted using the first statistical model and the second feature is extracted using the second statistical model, wherein the first statistical model indicates a measure of importance of attribute of the product;
train a probabilistic classifier to provide a plurality of classification models including a first classification model and a second classification model, wherein the probabilistic classifier is trained using the first feature to provide the first classification model and the second feature to provide the second classification model;
calculate an accuracy score of each of the plurality of classification models, the accuracy score providing a measure of predicting a correct category belonging to a preset hierarchy of predefined categories for the product, wherein the accuracy score is calculated for each distinct category in the preset hierarchy;
select a classification model from the plurality of classification models for each category in the preset hierarchy based on the accuracy score, the classification model being selected for classifying the product into a most relevant category of the preset hierarchy, wherein the selected classification model has the highest accuracy score for a corresponding category in the preset hierarchy;
determine a probability of classifying the product into a correct category based on the selected classification model to validate a suitability of selected classification model; and
based on the determined probability, auto-classify the product in a category of the category hierarchy; and
provide results of the classification to an output device.

16. The non-transitory computer readable medium as claimed in claim 15 including machine executable instructions that are executable by the processor to further:
compare the probability with a set of one or more predefined threshold values including a first threshold value and a second threshold value; and
perform an action on the training data based on the comparison, wherein the action includes, at least one of, triggering a classification of the product into the most relevant category when the probability is equal to or greater than the first threshold value, indicating the product corresponding to the selected feature for manual classification into the most relevant category in the preset hierarchy when the probability is between the first threshold value and the second threshold value, and indicating a review of the attribute when the probability is less than or equal to the second threshold value.

17. The non-transitory computer readable medium as claimed in claim 15 including machine executable instructions that are executable by the processor for receiving the training data to further:
- annotate the training data based on a predefined semantic dictionary related to the product and at least one of a part-of-speech and a collocation in the training data; and
- identify the attribute from the annotated training data based on a feature identification model.

18. The non-transitory computer readable medium as claimed in claim 15 including machine executable instructions that are executable by the processor for receiving the training data to further, at least one of:
- manipulate the training data based on one of a predefined semantic dictionary related to the product and a language dictionary, wherein the training data is manipulated to, at least one of, replace one of a term and a symbol, eliminate a redundant term, and reorder jumbled terms therein;
- customize the predefined semantic dictionary based on the manipulated training data;
- create the preset hierarchy of predefined categories based on the manipulated training data; and
- define a category in the preset hierarchy based on one of the feature and the attribute of the product.

19. The non-transitory computer readable medium as claimed in claim 15, wherein the attribute is distinct from the feature, and wherein the attribute includes a product type, a weight, a flavor type, a package type, a size, a dimension, a shape, a quantity, a pecuniary value, a color, an offer, a rating, a user type, a format, a utility, or a combination thereof, corresponding to the product.

20. The non-transitory computer readable medium as claimed in claim 15, wherein the classification model is selected for each category in a predefined level of the preset hierarchy.

* * * * *